United States Patent
Zimmer et al.

(10) Patent No.: US 10,832,374 B2
(45) Date of Patent: Nov. 10, 2020

(54) IMAGE DECOMPOSITION AND PATH-SPACE MOTION ESTIMATION

(71) Applicants: Disney Enterprises, Inc., Burbank, CA (US); ETH Zürich (Eidgenössische Technische Hochschule Zürich), Zürich (CH)

(72) Inventors: Henning Zimmer, Zurich (CH); Olga Sorkine Hornung, Zurich (CH); Oliver Wang, Zurich (CH); Alexander Sorkine Hornung, Zurich (CH); Wenzel Jakob, Zurich (CH); Fabrice Pierre Armand Rousselle, Bern (CH); Wojciech Krzysztof Jarosz, Hanover, NH (US); David M. Adler, Los Angeles, CA (US)

(73) Assignee: Disney Enterprises, Inc., Burbank, CA (US)

(*) Notice: Subject to any disclaimer, the term of this patent is extended or adjusted under 35 U.S.C. 154(b) by 170 days.

(21) Appl. No.: 14/997,448

(22) Filed: Jan. 15, 2016

(65) Prior Publication Data
US 2016/0210777 A1    Jul. 21, 2016

Related U.S. Application Data

(60) Provisional application No. 62/104,585, filed on Jan. 16, 2015.

(51) Int. Cl.
G06T 15/00    (2011.01)
G06T 3/40    (2006.01)
(Continued)

(52) U.S. Cl.
CPC ............ G06T 3/4007 (2013.01); G06T 5/002 (2013.01); G06T 15/506 (2013.01)

(58) Field of Classification Search
CPC ........... G06T 15/80; G06T 13/40; G06T 3/40; G06T 7/20
(Continued)

(56) References Cited

U.S. PATENT DOCUMENTS 8,780,213 B2 * 7/2014 Kanamori ................. G06T 3/40
                                                  348/207.99
8,873,636 B2 * 10/2014 Iwasaki ..................... G06T 9/00
                                                  375/240.24
(Continued)

OTHER PUBLICATIONS

Lochmann G., Reinert B., Ritschel T., Müllers., Seidel H.: Real-time reflective and refractive novel-view synthesis. In VMV 2014 (2014), pp. 9-16.*
(Continued)

*Primary Examiner* — Phu K Nguyen
(74) *Attorney, Agent, or Firm* — Baker Botts L.L.P.

(57) ABSTRACT

Particular embodiments perform a light path analysis of an image comprising a scene, wherein the scene comprises at least one refractive or reflective object. The image may be decomposed based on the light path analysis into a plurality of components, each of the components representing a contribution to lighting in the scene by a different type of light interaction. For each of the components, one or more motion vectors are extracted for each of the components in order to capture motion in the scene. Finally, a final contribution of each of the components to the image is computed based on the motion vectors.

19 Claims, 31 Drawing Sheets
(26 of 31 Drawing Sheet(s) Filed in Color)

(51) Int. Cl.
*G06T 15/50* (2011.01)
*G06T 5/00* (2006.01)

(58) Field of Classification Search
USPC ......................................................... 345/419
See application file for complete search history.

(56) References Cited

U.S. PATENT DOCUMENTS

| | | | |
|---|---|---|---|
| 9,299,188 B2* | 3/2016 | Karsch | G06T 15/50 |
| 9,418,469 B1* | 8/2016 | Parmar | G06T 15/06 |
| 9,471,967 B2* | 10/2016 | Karsch | H04N 5/272 |

OTHER PUBLICATIONS

Grosse, R., Johnson, M. K., Adelson, E. H., & Freeman, W. T. (Sep. 2009). Ground truth dataset and baseline evaluations for intrinsic image algorithms. In Computer Vision, 2009 IEEE 12th International Conference on (pp. 2335-2342). IEEE.*
Lockmann, Real-time Reflective and Refractive Novel-view Synthesis; Dec. 15, 2014.https://www.youtube.com/watch?v=BnOaXUIClLw.*
Lochmann G, Reinert B, Buchacher A, Ritschel T. Real-time novel-view synthesis for volume rendering using a piecewise-analytic representation. InVMV'16 Proceedings of the Conference on Vision, Modeling and Visualization Oct. 12, 2016 (vol. 2016). Eurographics.*
Hadwiger M, Ljung P, Salama CR, Ropinski T. Advanced illumination techniques for gpu-based volume raycasting. InACM SIGGRAPH 2009 Courses Aug. 3, 2009 (p. 2). ACM.*
Adelson, et al., Exact ray-traced animation frames generated by reprojection, Tech. Rep. GIT-GVU-93-30, Georgia Institute of Technology, Atlanta, GA, Jul. USA, 1993, pp. 1-18.
Badt, et al., Two algorithms for taking advantage of temporal coherence in ray tracing, The Visual Computer 4, 3, 1988, 123-132.
Bala, et al., Radiance Interpolants for Accelerated Bounded-Error Ray Tracing, ACM Trans. Graph. Aug. 1999, 18(3):213-256.
Bauszat, et al., Sample-based Manifold Filtering for Interactive Global Illumination and Depth of Field, Comput. Graph. Forum, 2014, 33(2):1-12.
Beier, et al., Feature-based Image Metamorphosis, Computer Graph. 26, In SIGGRAPH, Jul. 2, 1992, pp. 35-42.
Bell, et al., Intrinsic Images in the Wild, ACM Trans. Graph. 2014, pp. 1-12, 2014.
Bertalmio, et al., Image Inpainting, In SIGGRAPH (2000), pp. 1-8.
Bowles, et al., Iterative Image Warping, Comp. Graph. Forum (2012), 31(2):237-246.
Brostow, et al., Image-based Motion Blur for Stop Motion Animation, In SIGGRAPH (2001), pp. 1-6.
Brox, et al., High Accuracy Optical Flow Estimation Based on a Theory for Warping, In ECCV (2004), pp. 25-36.
Buades, et al., A Non-Local Algorithm for Image Denoising, In CVPR, 2005, pp. 1-6.
Buades, et al., Nonlocal Image and Movie Denoising, International Journal of Computer Vision (2008), 76(2):123-139.
Butler, et al., A Naturalistic Open Source Movie for Optical Flow Evaluation, 2012, In ECCV, pp. 611-625.
Chen, et al., View Interpolation for Image Synthesis, In SIGGRAPH (1993), pp. 279-288.
Dabala, et al., Manipulating Refractive and Reflective Binocular Disparity, Comp. Graph. Forum (Proc. Eurographics 2014), 33(2):1-10.
Dammertz, et al., Edge-Avoiding A-Trous Wavelet Transform for Fast Global Illumination Filtering, (HPG 2010), Ulm University, Germany, pp. 1-9.
Dayal, et al., Adaptive Frameless Rendering, In Rendering Techniques, 2005, pp. 265-275.

Didyk, et al., Perceptually-motivated Real-Time Temporal Upsampling of 3D Content for High-Refresh-Rate Displays, Comp. Graph. 2010, 29(2):713-722.
Eisenacher, et al., Sorted Deferred Shading for Production Path Tracing, Comput. Graph. Forum 2013, 32(4):125-132.
Goddard, Silencing the Noise on Elysium, In ACM SIGGRAPH 2014 Talks (2014), ACM.
Havran, et al., An Efficient Spatio-Temporal Architecture for Animation Rendering, In SIGGRAPH, 2003, pp. 106-117.
He, et al., Guided Image Filtering, IEEE Trans. Pattern Anal. Mach. Intell. 35, 6 (2013), pp. 1-13.
Heckbert, Adaptive Radiosity Textures for Bidirectional Ray Tracing, In SIGGRAPH. (Aug. 1990), pp. 1-10.
Herzog, et al., Spatio-temporal Upsampling on the GPU, In SI3D (2010), pp. 91-98.
Hill, et al., Physically Based Shading in Theory and Practice, In ACM SIGGRAPH 2014 Courses (New York, NY, USA, 2014), SIGGRAPH '14, ACM. pp. 1-2.
Igehy, Tracing ray differentials, In SIGGRAPH (1999), pp. 1-8.
Jakob, et al., Manifold exploration: A Markov Chain Monte Carlo Technique for Rendering Scenes with Difficult Specular Transport, ACM Trans. Graph. 2012, 31(4):1-13.
Jakob, Light Transport on Path-Space Manifolds, PhD thesis, Cornell University, Aug. 2013.
Jakob, Mitsuba Renderer, 2010, http://www.mitsuba-renderer.org, accessed on Jan. 13, 2019.
Kainz, Interpreting OpenEXR Deep Pixels, 2012, pp. 1-17.
Kopf, et al., Joint Bilateral Upsampling, ACM Trans. Graph. 26, 2007, 3(96):1-5.
Kopf et al., Image-Based Rendering in the Gradient Domain, ACM Trans. Graph. 2013, 32(6):1-9.
Krivánek, et al., Recent Advances in Light Transport Simulation: Theory and practice, In ACM SIGGRAPH Courses (2014), SIGGRAPH '14, ACM.
Lischinski, et al., Image-based Rendering for Non-Diffuse Synthetic Scenes, In Rendering Techniques, 1998, pp. 1-15.
Lochmann, et al., Real-time Reflective and Refractive Novel-View Synthesis, In VMV 2014 (2014), pp. 1-8.
Mark, et al., Post-rendering 3D Warping, In SI3D (1997), pp. 7-16.
Mehta, et al., Factored Axis-Aligned Filtering for Rendering Multiple Distribution Effects, ACM Trans. Graph. (Jul. 2014), 33(4):1-12.
Moon, et al., Robust Image Denoising Using a Virtual Flash Image for Monte Carlo Ray Tracing, Comput. Graph. Forum 2013, 32(1):1-13.
Nehab, et al., Accelerating Real-Time Shading with Reverse Reprojection Caching, In Graphics Hardware, 2007, pp. 1-11.
NVIDIA: Iray whitepaper, 2012, pp. 1-25.
Pérez, et al., Poisson Image Editing, ACM Trans. Graph. 22, 3 (Jul. 2003), pp. 313-318.
Roth, et al., Specular Flow and the Recovery of Surface Structure, In CVPR, 2006, pp. 1-9.
Rousselle, et al., Adaptive Rendering with Non-Local Means Filtering, ACM Trans. Graph. Nov. 2012, 31(6):1-12, 2012.
Rousselle, et al., Robust Denoising Using Feature and Color Information, Computer Graphics Forum (2013), 32(7):1-10.
Saito, et al., Comprehensible Rendering of 3-D Shapes, SIGGRAPH Comp. Graph. (Aug. 1990), 24(4):1-10.
Scherzer, et al., A Survey on Temporal Coherence Methods in Real-Time Rendering, In Eurographics 2011 State of the Art Reports, 2011, pp. 1-26.
Scherzer, et al., Pixel-Correct Shadow Maps with Temporal Reprojection and Shadow Test Confidence, In Rendering Techniques, 2007, pp. 1-6.
Segovia, et al., Non-interleaved Deferred Shading of Interleaved Sample Patterns, In Proc. Graphics Hardware (2006), ACM, pp. 1-9.
Sen, et al., On Filtering the Noise from The Random Parameters in Monte Carlo Rendering, ACM Trans. Graph. (2012), 31(3):1-14.
Shade, et al., Layered Depth Images, In SIGGRAPH, 1998, pp. 1-12.
Shinya, Improvements on The Pixel-Tracing Filter: Reflection/refraction, Shadows and Jittering, In Graphics Interface (1995), Canadian Information Processing Society, pp. 92-102.

(56) References Cited

OTHER PUBLICATIONS

Simmons, et al., Tapestry: A Dynamic Mesh-Based Display Representation for Interactive Rendering, In Rendering Techniques, 2000, pp. 1-13.
Sinha, et al., Image-based Rendering for Scenes with Reflections, ACM Trans. Graph. 31, 2012, pp. 1-10.
Sitthi-Amorn, et al., Automated Reprojection-Based Pixel Shader Optimization, ACM Trans. Graph. 27, 2008, pp. 1-10.
Sloan et al., Image-based Proxy Accumulation for Real-Time Soft Global Illumination, In Pacific Graphics (2007), pp. 1-9.
Tole, et al., Interactive Global Illumination in Dynamic Scenes, ACM Trans. Graph. 2002, 21(3):537-546.
Tomasi, et al., Bilateral filtering for gray and color images, In ICCV, 1998, pp. 1-8.
Veach, Robust Monte Carlo Methods for Light Transport Simulation, PhD thesis, Stanford, CA, USA, 1998. AAI9837162.
Vedula, et al., Image Based Spatio-Temporal Modeling and View Interpolation of Dynamic Events, ACM Trans. Graph. 2005, 24(2):1-31.
Wald, et al., Interactive Global Illumination Using Fast Ray Tracing, In Proceedings of the 13th Eurographics Workshop on Rendering (EGWR) (2002), pp. 1-11.
Walter, et al., Interactive Rendering Using the Render Cache, In Rendering Techniques, 1999, pp. 19-30.
Walter, et al., Microfacet Models for Refraction Through Rough Surfaces, In Rendering Techniques, 2007, pp. 1-12.
Ward, et al., A ray tracing solution for diffuse interreflection, SIGGRAPH Comp. Graph. 22, 4 (Jun. 1988), pp. 1-8.
Yang, et al., Image-based Bidirectional Scene Reprojection, ACM Trans. Graph. (2011), 30(6):1-10.
Yang, et al., Amortized Supersampling, ACM Trans. Graph. 2009, 28(5):1-12.
Ye et al., Intrinsic Video and Applications, ACM Trans. Graph. 80, (2014), 33(4):1-11.
Zimmer, et al., Optic Flow in Harmony, International Journal of Computer Vision, 2011, 93(3): 1-21.
Zimmer, et al., Path-space Motion Estimation and Decomposition for Robust Animation Filtering, 2015, 34(4):1-12.
Zitnick, et al., High-quality Video View Interpolation Using a Layered Representation, ACM Trans. Graph. (2004), 23(3):1-9.
Zwicker, et al., Recent Advances in Adaptive Sampling and Reconstruction for Monte Carlo Rendering, Comp. Graph. Forum, (2015), pp. 1-16.

* cited by examiner

ED → reflectance

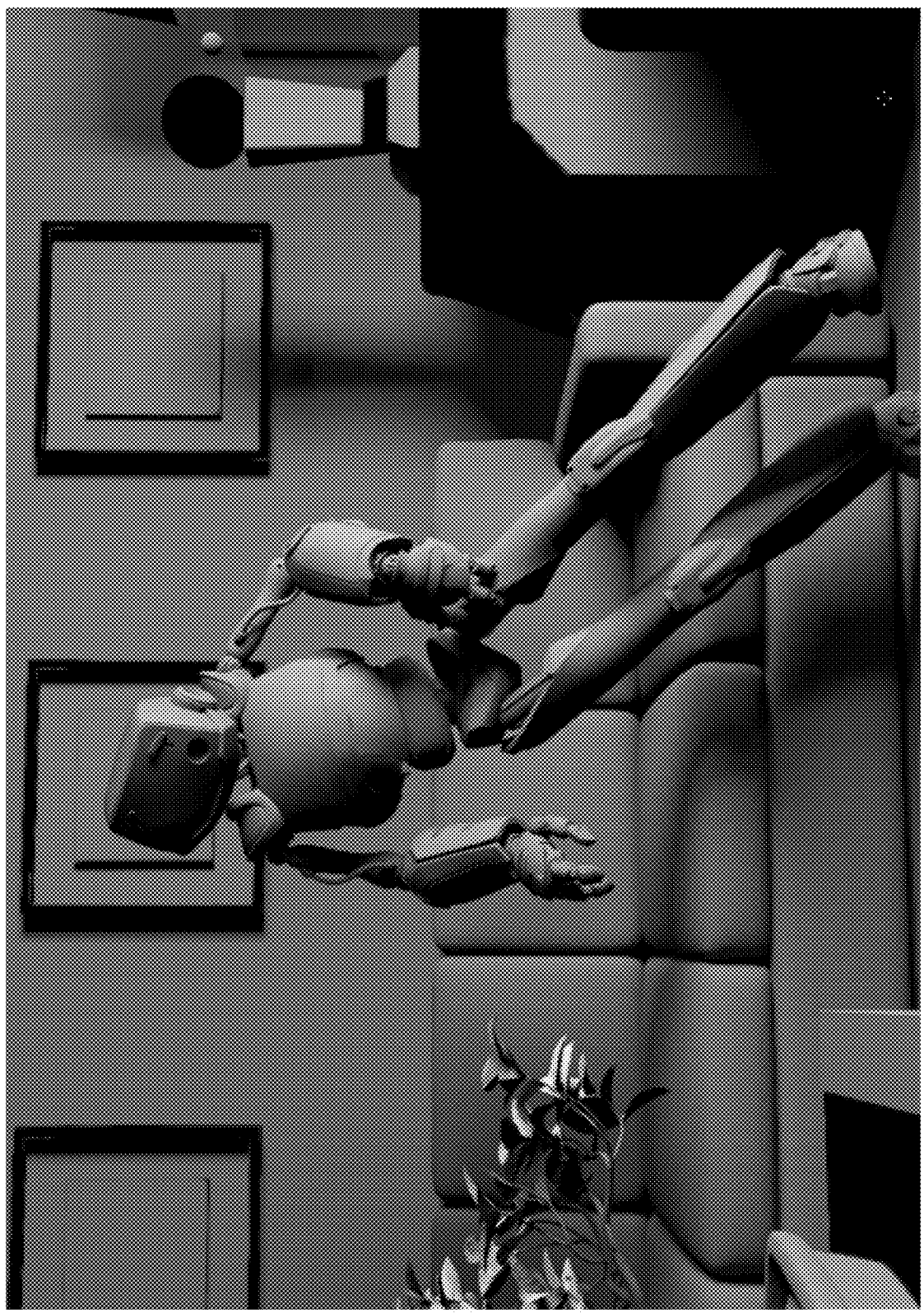
FIG. 7A  keyframe 1

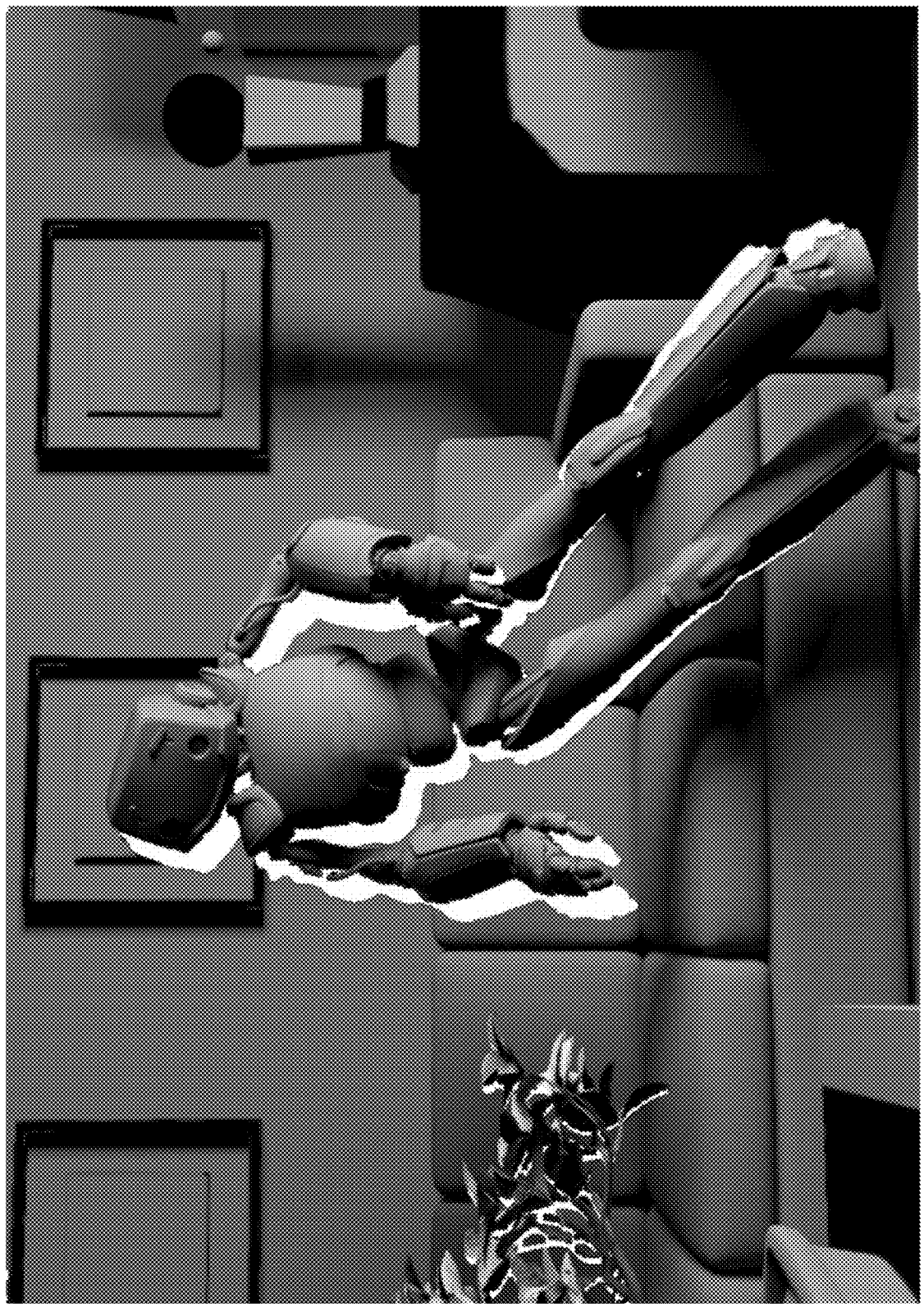
FIG. 7B  warped keyframe 2

IMAGE DECOMPOSITION AND PATH-SPACE MOTION ESTIMATION

PRIORITY

This application claims the benefit, under 35 U.S.C. § 119(e), of U.S. Provisional Patent Application No. 62/104,585, filed 16 Jan. 2015, which is incorporated herein by reference.

TECHNICAL FIELD

This disclosure generally relates to three-dimensional ("3D") computer graphics.

BACKGROUND

Pixar is well known for producing award-winning three-dimensional ("3D") computer-animated films, such as "Toy Story" (1995), "Monsters, Inc." (2001), "Finding Nemo" (2003), "The Incredibles" (2004), "Ratatouille" (2007), "WALL-E" (2008), "Up" (2009), and "Brave" (2012). In order to produce films such as these, Pixar developed its own platform for network-distributed rendering of complex 3D graphics, including ray-traced 3D views. The RenderMan® platform includes the RenderMan® Interface Specification (an API to establish an interface between modeling programs, e.g., AUTODESK MAYA, and rendering programs in order to describe 3D scenes), RenderMan® Shading Language (a language to define various types of shaders: surface, light, volume, imager, and displacement), and PhotoRealistic RenderMan® (a rendering software system).

Modern computer-animated movies have reached an impressive level of visual complexity and fidelity, driven in part by the industry adoption of physically based rendering and production path tracing. Unfortunately, these gains come at tremendous computational effort. Given that hundreds of thousands of frames are needed for a feature length film, the computational costs are a critical factor that will become even more important with the proliferation of stereoscopic, high-resolution, and high-frame rate cinema and home displays.

These computational costs may be greatly reduced by tracing a reduced number of paths, followed by efficient image-based enhancement as a post-process. Depending on the manner in which the number of path samples is reduced, a variety of image-based methods may be used. For example, using fewer spatial samples requires upsampling, using fewer temporal samples requires frame interpolation, and using fewer samples-per-pixel requires denoising. As the computational complexity of image-based methods scales with the number of pixels and not with the scene and lighting complexity, they may be very efficient compared to computing similar quality effects by rendering alone. Consequently, such methods are becoming a vital part of any production rendering pipeline based on path tracing.

Denoising, interpolation and upsampling have been extensively studied in the vision and image processing communities. Nevertheless, the achieved quality often does not meet the standards of production renderings, which is mainly due to the inherently ill-posed nature of these problems. On the other hand, in a rendering context, additional scene information is available that may greatly improve the robustness of these approaches by providing auxiliary cues such as motion vectors or depth. This has been leveraged for real-time frame interpolation, spatio-temporal upsampling, as well as for denoising path-traced renderings.

A fundamental problem remains, however: The observed color of a pixel is a composite of various effects, influenced by the albedo of scene objects, shadows, and specular effects such as reflections, refractions, etc. As a result, averaging neighboring pixels for denoising or upsampling inevitably leads to undesirable interference of the different effects. Similarly, there is no single motion vector or depth per pixel, and thus interpolating frames leads to ghosting artifacts.

SUMMARY

Particular embodiments provide a general and customizable decomposition framework, where the final pixel color may be separated into disjoint components, each corresponding to a subset of all light paths, or shading effects. Each component may be accompanied by motion vectors and other auxiliary features such as, by way of example and not limitation, reflectance and surface normals. In particular embodiments, the surface normal's output for curves (e.g., hair) may contain the curve's tangent direction rather than its normal. Motion vectors of specular paths may be computed using a temporal extension of manifold exploration and the remaining components use a specialized variant of optical flow. In order to compute accurate motion vectors for secondary lighting effects such as reflections and shadows, particular embodiments may (1) provide a temporal extension of manifold exploration to handle arbitrary specular effects, and/or (2) augment image-based optical flow approaches to leverage the auxiliary features for improved matching. For the remaining components particular embodiments may utilize a classical optical flow, bootstrapped with the motion vectors of the scene geometry. Decomposition may be performed during rendering, in path-space. Particular embodiments may then perform image-based spatio-temporal upsampling, denoising, and/or frame interpolation.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 7A-7C illustrate example aspects of performing optical flow-based motion estimation for an irradiance component of the scene decomposition of FIG. 2.

In order to describe and illustrate embodiments and/or examples of any inventions presented within this disclosure, reference may be made to one or more accompanying drawings. The additional details or examples used to describe the accompanying drawings should not be considered as limitations to the scope of any of the disclosed inventions, any of the presently described embodiments and/or examples, or the presently understood best mode of any invention presented within this disclosure.

DESCRIPTION OF EXAMPLE EMBODIMENTS

Decomposition

Particular embodiments may utilize a rendering system, e.g., the RenderMan® platform, to decompose an image of a scene into components corresponding to disjoint subsets of the space of light paths in the scene. By such decomposition, particular embodiments may accomplish the separation of several different scattering effects like chains of specular reflections and refractions so that they do not interfere in image-based post-processing methods. Particular embodiments may decompose the rendered image into disjoint path space components by using a tree of regular expressions, where each leaf node corresponds to an image buffer.

Figure 1:
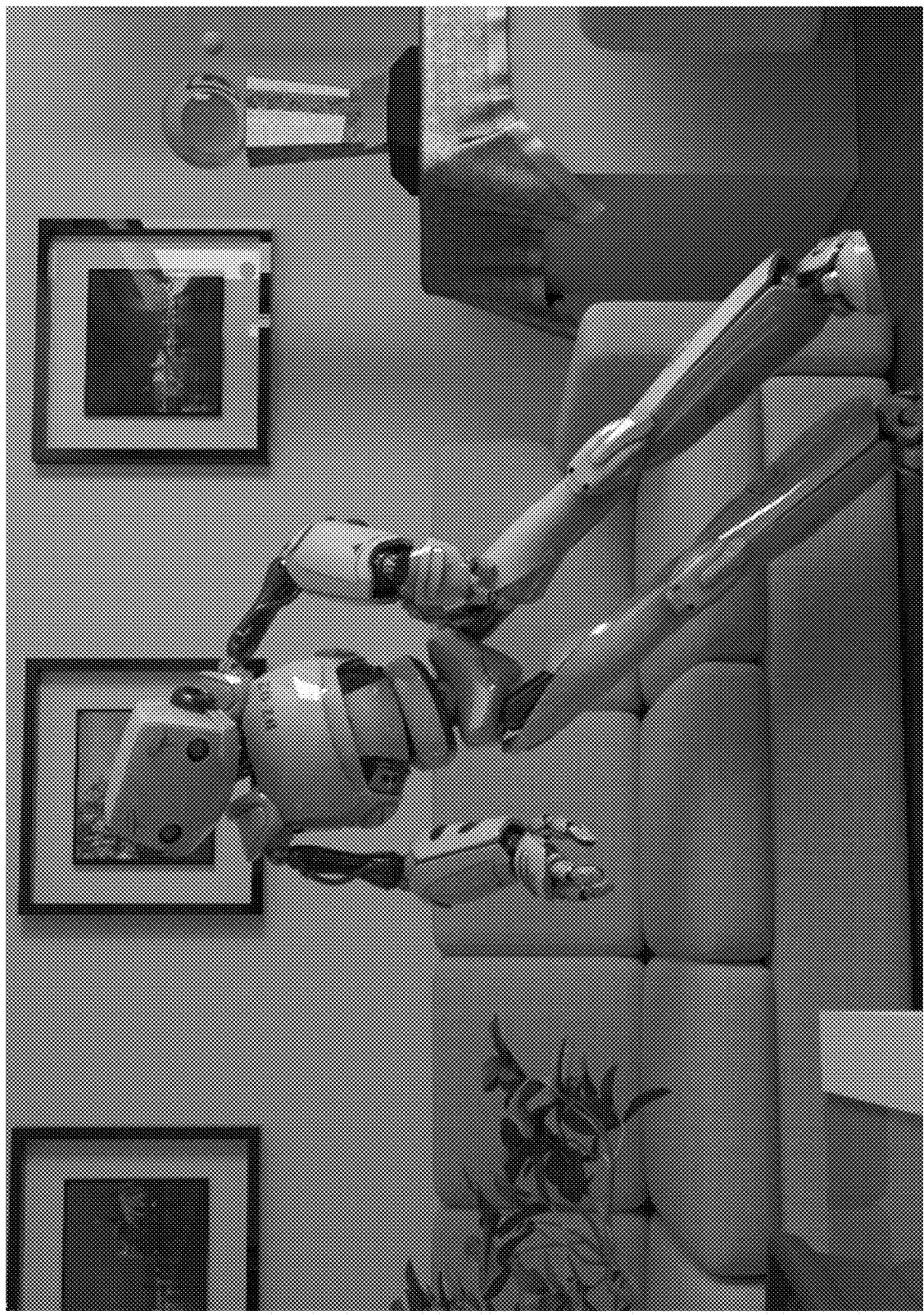
FIG. 1 illustrates an example scene (Robot scene) captured in a frame.

FIG. 1 illustrates an example scene (Robot scene) with complex lighting effects captured in a frame. The Robot scene includes a variety of objects with different reflective and refractive attributes, as well as a variety of types of lighting of those objects due to direct and indirect diffuse scattering, specular reflections, specular transmissions, and other residual lighting effects (typically, low-frequency, low-magnitude content). Such factors (and more) may affect the color of each pixel in the scene.

Figure 1A:
FIGS. 1A-1C illustrate examples of a scene to which embodiments described herein have been applied.
Figure 1B:
Figure 1C:
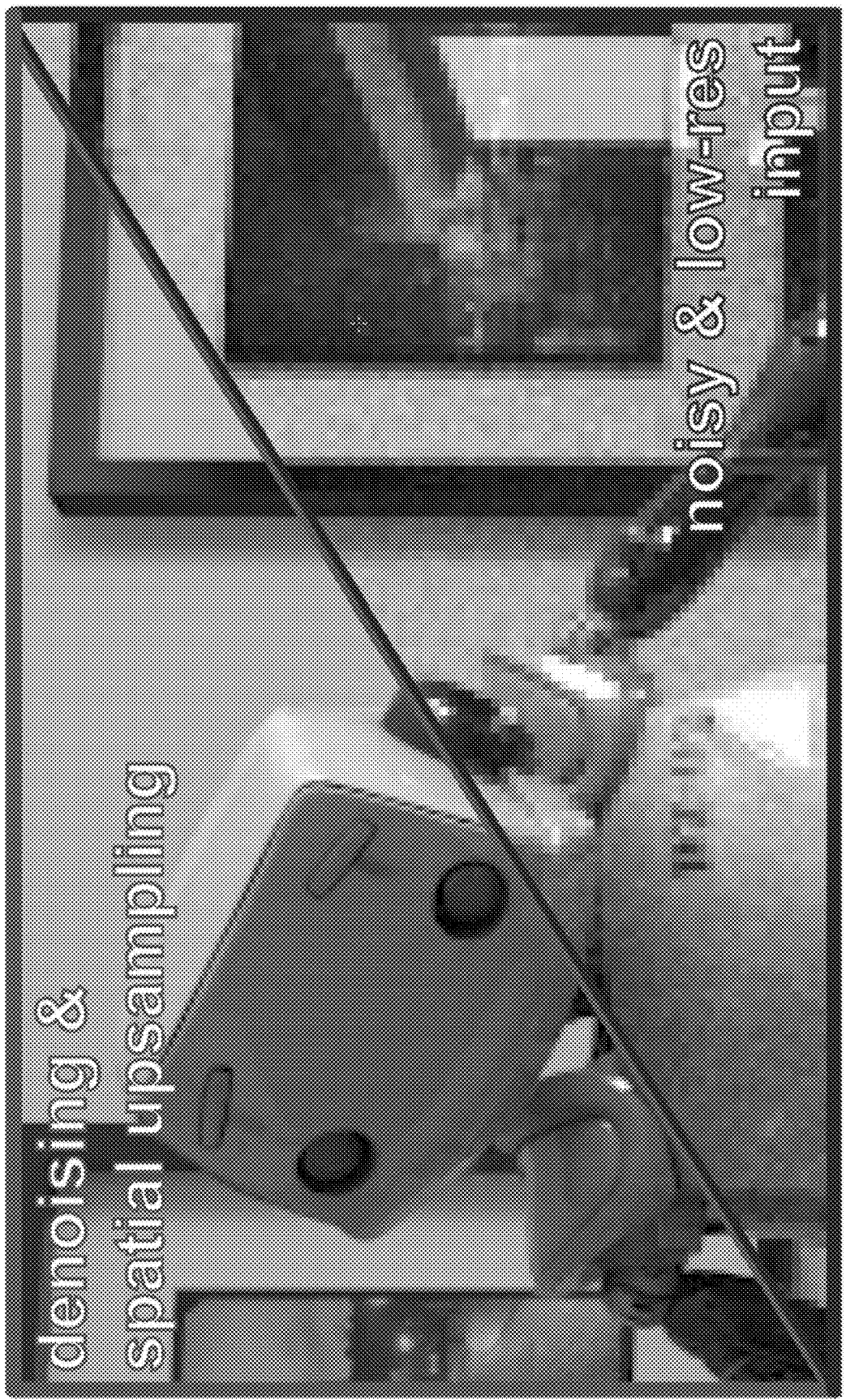

FIGS. 1A-1C illustrate examples of a portion of the Robot scene of FIG. 1 to which embodiments described herein have been applied. Given noisy, low-resolution frames generated with a path tracer (as shown in FIGS. 1A and 1C within the red borders), particular embodiments may improve quality and reduce computational cost by computing spatially upsampled and denoised content (as shown in FIGS. 1A and 1C within the green borders) and/or spatially and temporally upsampled and denoised content (as shown in FIG. 1B within the blue border) while properly preserving view-dependent shading effects like the reflections in the picture frame and on the robot.

In particular embodiments, image-based methods like denoising, spatial upsampling and frame interpolation may be performed as post-processing steps in a production environment with high visual quality requirements. One limiting factor for such image-based methods may be ambiguities caused by complex lighting effects, an example of which is shown in FIG. 1. In particular embodiments, ambiguities may either be resolved or remain below a perceptual threshold, e.g., each component is characterized by a single motion vector and a single spatial structure per image pixel.

Figure 3:
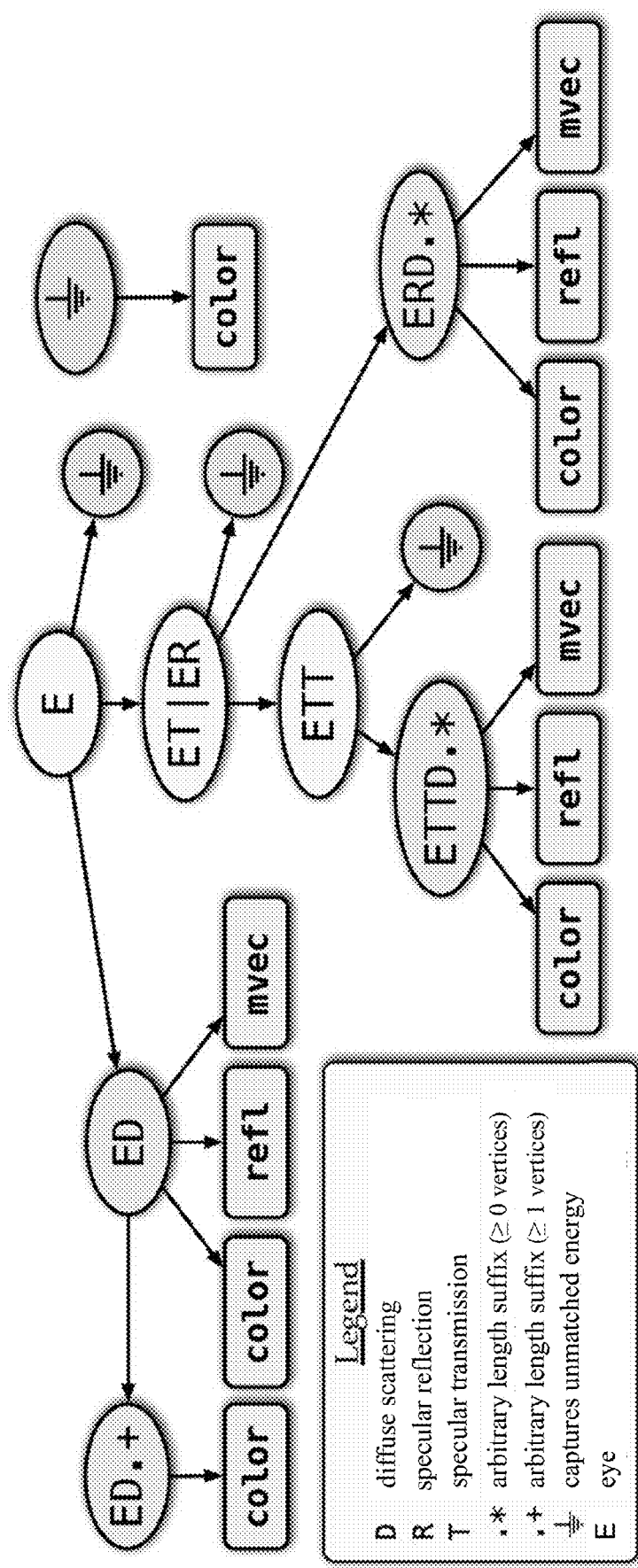
FIG. 3 illustrates a schematic for the scene decomposition of FIG. 2.

Particular embodiments use a decomposition technique based on light path analysis following a standard path-space formalism, which models light transport using integrals over light paths. Each path is a piecewise linear trajectory between the camera and a light source, where each vertex represents an intermediate scattering interaction. In order to define the decomposition, regular expression notation may be utilized to classify light paths or families of similar light paths. The first vertex on the camera sensor is labeled E, and each subsequent scattering vertex encodes the underlying material: diffuse (D), specular or glossy reflection (R), and specular or glossy transmission (T). Glossy light interactions (e.g., scattering off rough metal or glass) may be classified as R or T if the roughness is below a threshold (e.g., Beckmann roughness $\alpha<0.1$), otherwise they may be classified as diffuse. Families of similar light transport paths may be expressed using a regular expression syntax, as shown in the legend of FIG. 3.

Particular embodiments may be customized to flexibly focus on any number of salient light transport effects in specific scenes (e.g., by adding or eliminating path types). Each component may be associated with a color buffer, and the pixel-wise sum of these buffers yields the final image. A residual component ($\not\equiv$) may capture all unmatched paths and usually contains only low-frequency, low-magnitude content. However, it may still be important for the final image synthesis.

FIG. 2 and FIGS. 2A-2E illustrate an example of a decomposition of the Robot scene from FIG. 1, using a regular expression notation. The components (from top to bottom) are: direct diffuse (ED), indirect diffuse (ED.+), specular reflections (ERD. *), specular transmissions (ETTD.*), and a residual component ($\not\equiv$) that subsumes all previously unmatched paths. For each component, the color (first column) is extracted, as well as the reflectance (second column), and then the effective irradiance (third column) is computed as the ratio between them. The final image is obtained by multiplying each component's irradiance by its reflectance, and adding up the resulting colors.

Particular embodiments further decompose the individual components into irradiance and reflectance, to separate texture from lighting (see, e.g., FIGS. 2 and 2A-2E, columns two and three). This separation is beneficial for image-based methods as texture and lighting exhibit fundamentally different characteristics in structure, noise, and motion. For instance, the motion of the reflectance buffer is determined by the motion of shaded objects, whereas the apparent motion of the irradiance is also affected by the motion of occluders and light sources. Other embodiments may decompose a scene into more or fewer components, e.g., just two components: diffuse (ED.*) and specular (sum of ET.* and ER.*). Such embodiments may denoise the two components separately after dividing the diffuse component by surface color.

Figure 2:
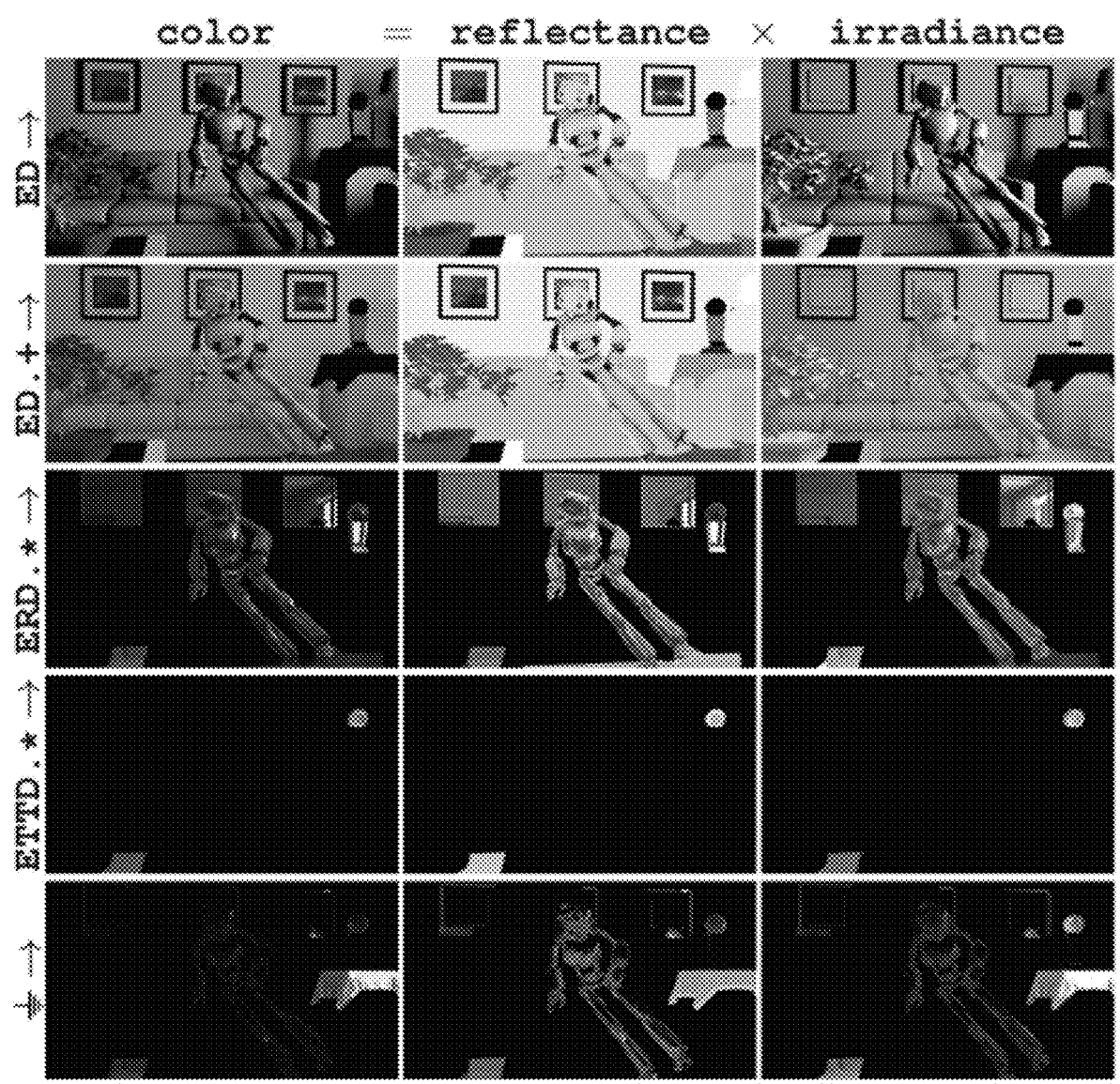
FIGS. 2 and 2A-2E illustrate an example of a scene decomposition.
Figure 2A:
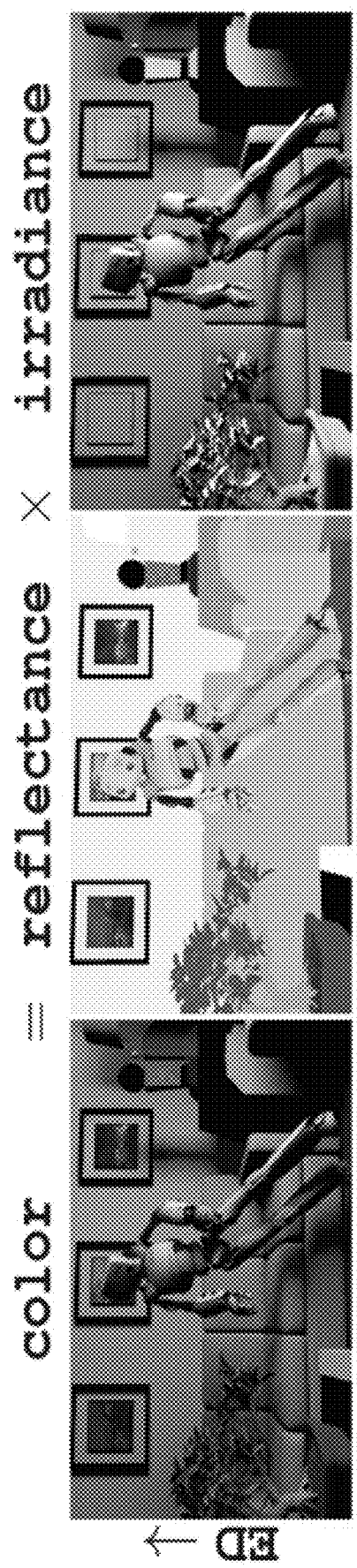
Figure 2B:
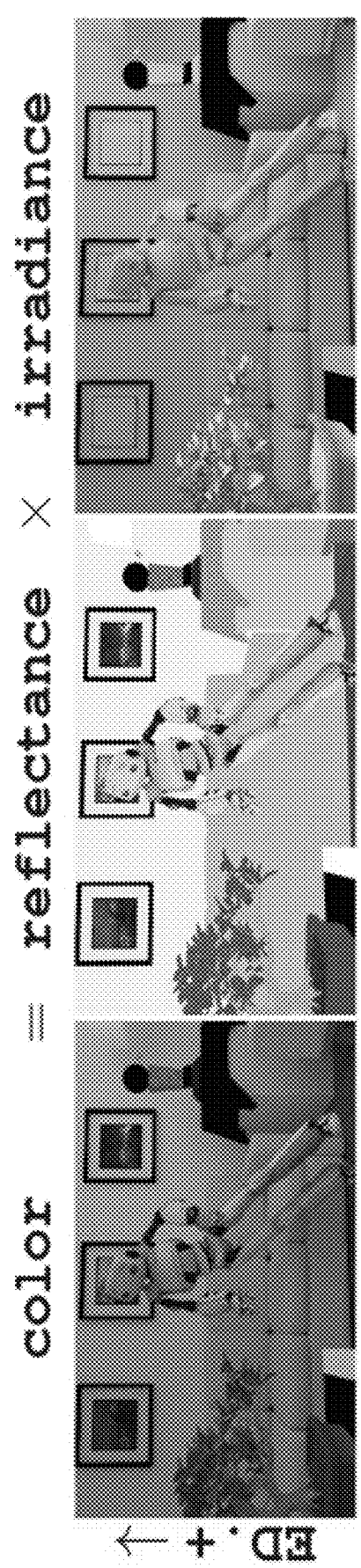
Figure 2C:
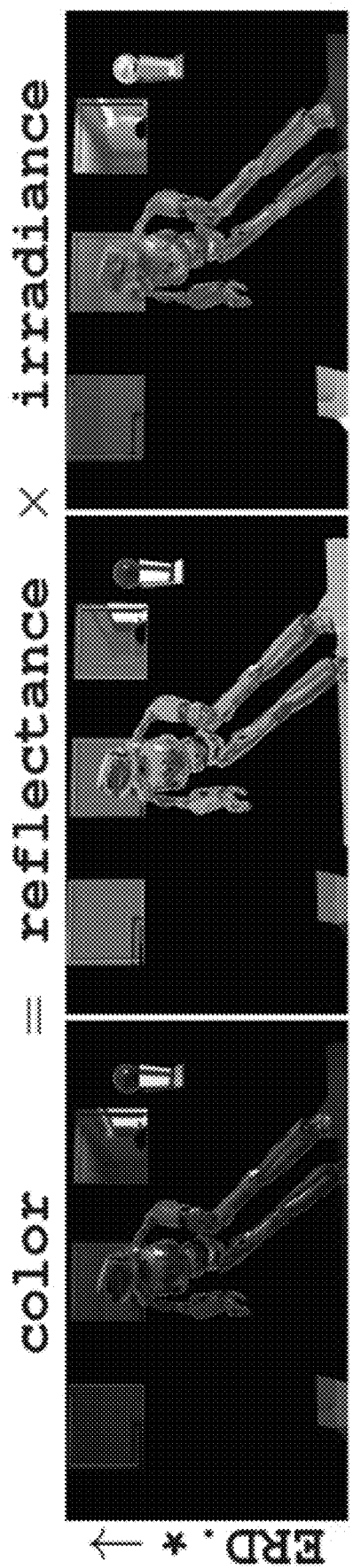
Figure 2D:
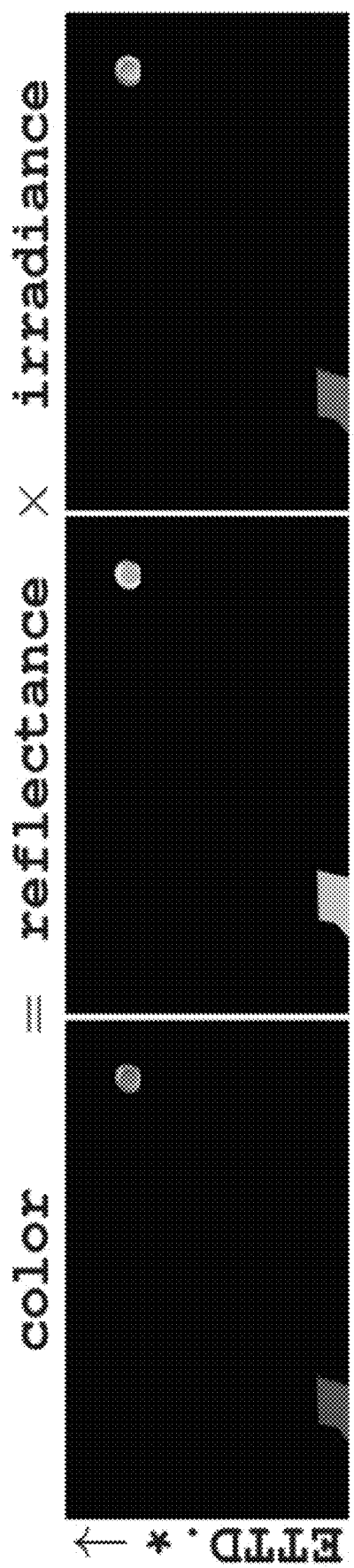
Figure 2E:
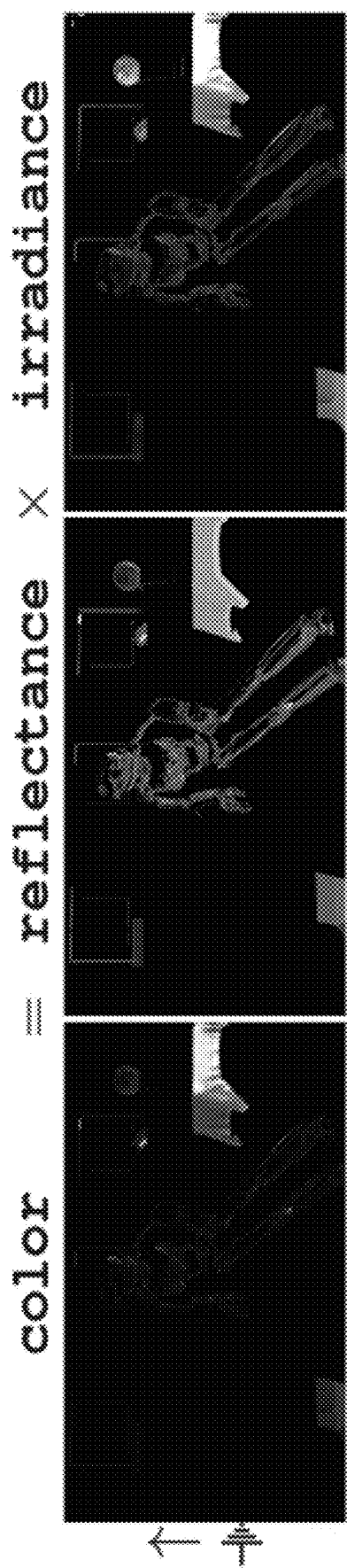

FIG. 3 illustrates a schematic illustration of the decomposition from FIG. 2, showing its tree-like structure. As light paths are traced from the camera/eye ("E"), their contribution and auxiliary data is stored into one of several image buffers (green).

As an example of texture/lighting separation (which may be applied to all other components of different types), the diffuse component's observed color can be expressed as:

$$ED \rightarrow \text{color} = \int_{S^2} \rho(\omega_i, \omega_o) L_d(\omega_i) d\omega_i^\perp,$$

where particular embodiments integrate the product of the BSDF $\rho(\omega_i, \omega_o)$ and the direct incident radiance $L_d(\omega_i)$ over the space of projected solid angles $\omega_i^\perp$ for the outgoing direction $\omega_o$. As mentioned previously, particular embodiments may additionally output a reflectance buffer during rendering which contains a Monte Carlo estimate of $$ED \rightarrow \text{reflectance} = \rho(\omega_o) = \frac{1}{\pi} \int_{S^2} \rho(\omega_i, \omega_o) d\omega_i^\perp.$$

In the case of a perfectly diffuse Lambertian surface, $\rho(\omega_o)$ is the standard directionless reflectance p of the surface, but this expression nicely generalizes to an "effective reflectance" for non-Lambertian materials containing glossy transmission or reflection. Previous works then compute the irradiance as the integral of all incoming radiance $L_d(\omega_i)$ and reconstruct the component's color as the product of reflectance and irradiance. However, this breaks down whenever the product of the integrals of reflectance and irradiance over a pixel differs from the integral of the products, which occurs in the presence of non-Lambertian surfaces, distribution effects such as depth-of-field or simple spatial anti-aliasing. Particular embodiments may compute an "effective" irradiance as the ratio between the component's color value and the effective reflectance, $$ED \rightarrow \text{irradiance} = \frac{ED \rightarrow \text{color}}{ED \rightarrow \text{reflectance}}.$$

Some embodiments may directly utilize surface reflectance color instead of calculating the ED→reflectance integral.

As very low reflectance values lead to numerical instability, particular embodiments do not divide by the reflectance when it is below $10^{-3}$ and instead directly use the radiance as irradiance, which may be done as these light paths do not contribute measurably. This effective irradiance factorization circumvents the limitations of the standard irradiance factorization (see FIG. 12 for an illustration) by enforcing a linear shading model on all pixels. This ensures, by construction, that the component's color may always be reconstructed as the product of reflectance and effective irradiance.

Particular embodiments also associate each component with a set of auxiliary features that may tangibly improve the performance of image-based methods. This data is collected at the first non-specular vertex of each path and may thus be easily obtained as a byproduct of path tracing. Particular embodiments may extract auxiliary features, such as, by way of example and not limitation: reflectance (as mentioned before), surface normal, object ID, face ID, texture coordinates, surface color, depth (distance) from camera, and emitted radiance from visible light sources (see FIG. 10 for examples). In particular embodiments, the surface normal's output for curves (e.g., hair) may contain the curve's tangent direction rather than its normal. The auxiliary features capture most of the characteristics of the corresponding components, including the details of the geometry seen through reflection or refraction.

Motion Estimation

Figure 4A:
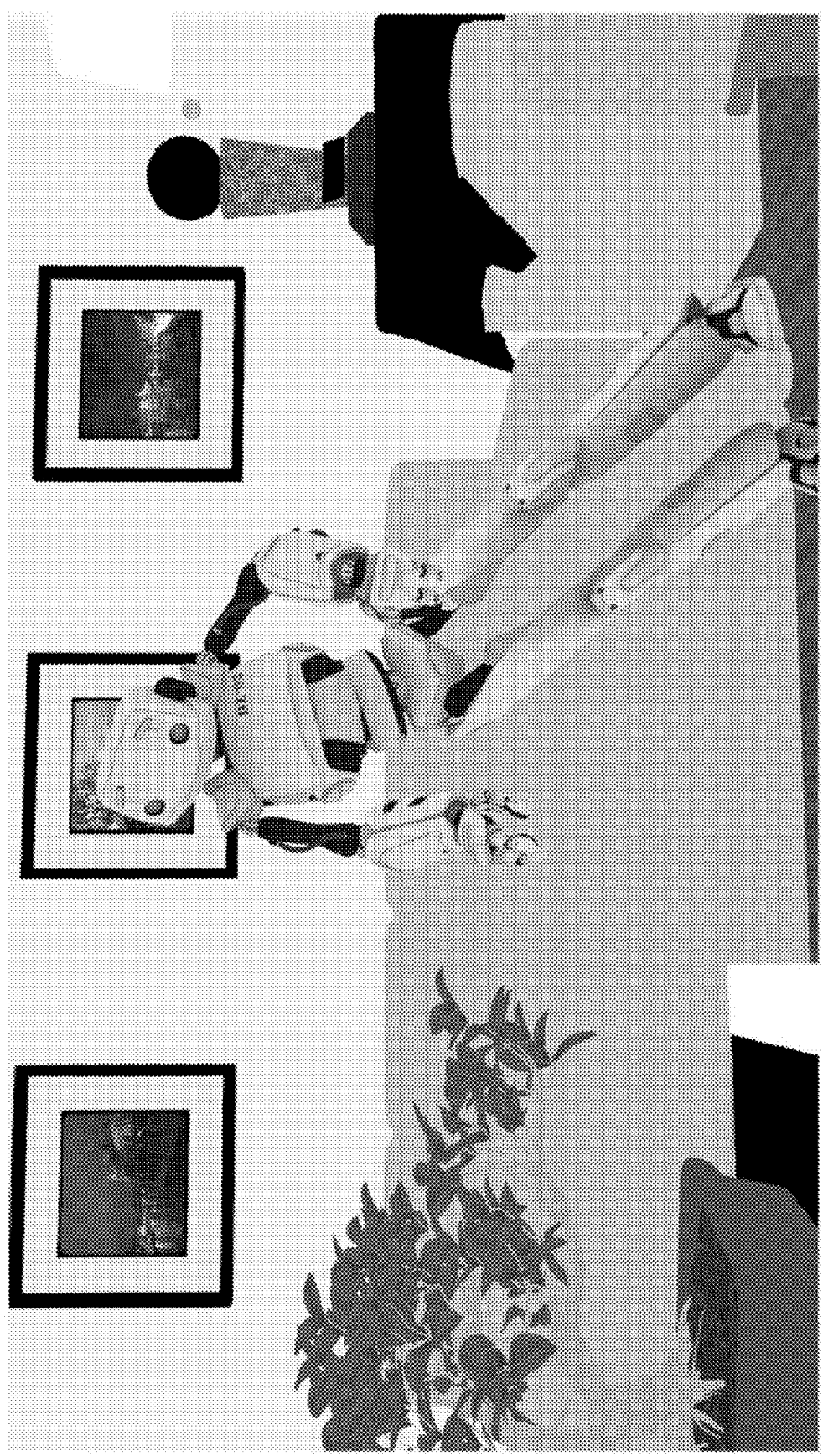
FIGS. 4A-4B illustrate an example diffuse reflectance component and its motion vectors for the scene decomposition of FIG. 2.
Figure 4B:

Image-based methods such as frame interpolation and temporally stable denoising require accurate motion vectors for each component of the decomposition. Disregarding the effects of shading and lighting, it is straightforward to extract motion vectors of visible surface positions on the scene geometry by mapping the underlying intersections forward in time and projecting the 3D motion into screen space. This disclosure refers to these as primary motion vectors. FIGS. 4A-4B illustrate an example diffuse reflectance component and its motion vectors for the scene decomposition of FIG. 2. The diffuse reflectance component and its (forward) motion vectors (a.k.a. primary motion vectors) are color coded as shown in the top right inset.

Specular motion vectors are significantly more challenging to extract due to the complex interaction of position, motion, orientation and curvature of the involved objects. Particular embodiments provide a generalized version of the manifold exploration ("ME") technique to compute the apparent motion of objects observed through a sequence of specular reflection or refractions. ME is based on the observation that light, which undergoes specular scattering events, follows trajectories that lie on a lower-dimensional manifold of transport paths akin to configuration spaces of a mechanical system. By finding local parameterizations of this manifold, it is possible to explore it via a sequence of one or more local steps. In the original version of ME, this was used to answer questions like: "if a 3D point seen through a static curved glass object moves, how does the corresponding observed point on the surface of the glass object shift?" By a temporal extension of the underlying manifolds, the same question can be answered for specular motion from frame to frame in general dynamic scenes.

Figure 5:
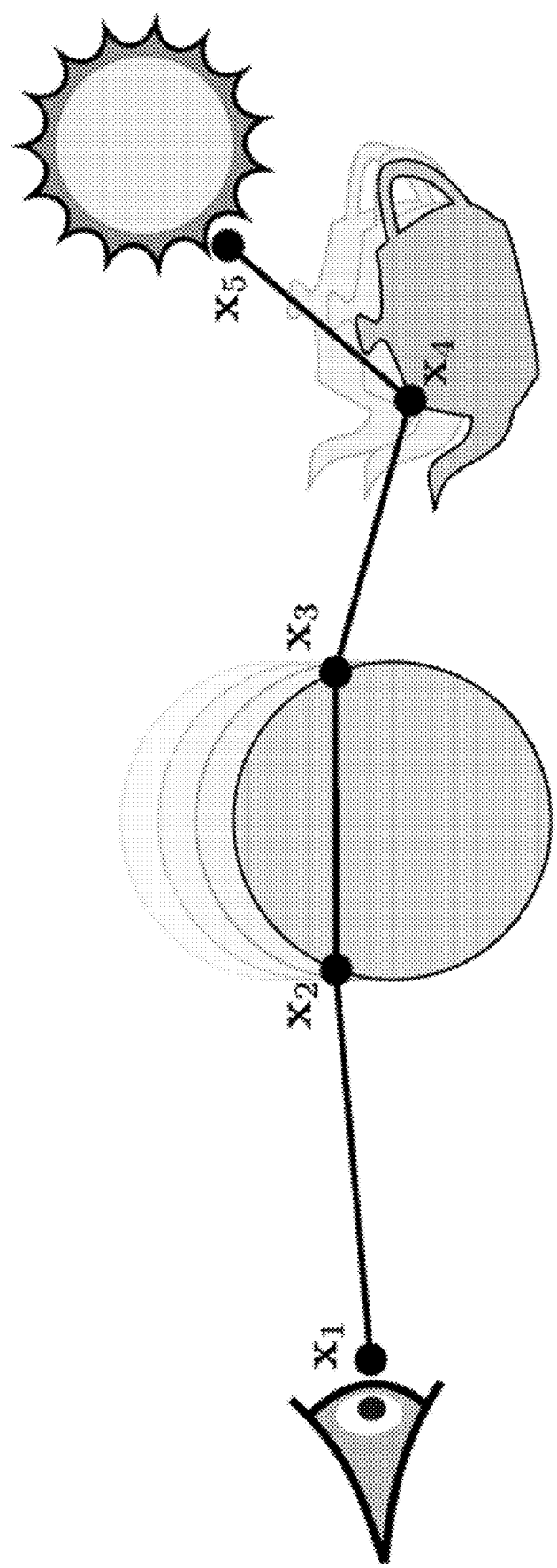
FIG. 5 illustrates an example schematic of a light path passing through a pair of specular refractions.

FIG. 5 illustrates an example of a moving non-specular object observed through a pair of moving specular refractions. To compute the effective motion of the object in the rendered image, particular embodiments fix vertices $x_1$ and $x_4$ of the light path and perform an implicit solve for the path configuration at the next frame. Given a light path with vertices $x_1, \ldots, x_N$ at time t, particular embodiments evolve its configuration up to the next frame t+1. Particular embodiments may then project the differences in the two configurations onto the image plane and obtain the image-space motion vectors.

Vertex $x_1$ is assumed to be a position on the aperture of the camera, and $x_n$ (n≤N, where N denotes the total number of path vertices) is an interaction with a non-specular material that is observed through a chain of specular interactions. Particular embodiments are based on the behavior up to the first non-specular interaction or light source $x_n$ (e.g., $x_5$ in FIG. 5) and ignore any subsequent vertices $x_{n+1}, \ldots, x_N$. Each specular interaction between $x_1$ and $x_n$ may be interpreted as a constraint that requires the incident and outgoing directions to satisfy a geometric relationship: in the case of a mirror, it requires the inclinations of the incident and outgoing directions to match. These constraints effectively collapse the set of contributing light paths to a lower-dimensional manifold, which may be explored using a Newton-like root-finder involving derivative computation and projection steps.

Particular embodiments may assume the rendering system has the capability of querying the position of the path vertices over time while keeping them rigidly attached to the underlying camera, shape, or light source. Hence, given the initial vertices $x_1(t), \ldots, x_N(t)$, their future positions may be determined as $x_1(t+1), \ldots, x_N(t+1)$. Generally, this new path is not in a valid configuration anymore, meaning that it may not satisfy the laws of specular reflection or refraction everywhere. Particular embodiments therefore derive a correction term that attempts to bring the vertices back into a valid configuration by analyzing the geometric properties of a local first-order approximation of the manifold of valid light paths.

Particular embodiments may assume that each vertex $x_i(t)$ has linearly independent tangent vectors $\partial_u x_i(t)$ and $\partial_v x_i(t)$, and that its position may be differentiated with respect to time, yielding a 3D motion vector $\partial_t x_i(t)$. Particular embodiments may use these three quantities to define a Taylor approximation $\hat{x}_i$ centered around the current vertex position $x_i(t)$ which parameterizes the vertex on a small neighborhood in space (parameters u, v) and time (parameter t):

$$\hat{x}_i(u,v,t) = x_i + u \cdot \partial_u x_i + v \cdot \partial_v x_i + t \cdot \partial_t x_i. \quad (1)$$

Particular embodiments add the last temporal term, which introduces extra derivative terms that propagate through the subsequent steps. Particular embodiments assume that all accented quantities are parameterized by (u, v, t). Similarly to the above equation, particular embodiments define an interpolated shading normal $\hat{n}_i$ by replacing all occurrences of $x_i$ by $n_i$ and normalizing the result of the interpolation. Finally, particular embodiments complete $\hat{n}_i$ to an orthonormal three-dimensional frame $\{\hat{s}_i, \hat{t}_i, \hat{n}_i\}$, where the $\hat{s}_i$ is aligned with $\partial_u x_i$ and where $\hat{t}_i = \hat{n}_i \times \hat{s}_i$.

Suppose now that a specular reflection or refraction with a relative index of refraction $\eta$ takes place at vertex $x_i$ ($\eta=1$ in the case of reflection). If the vertex is in a valid specular configuration, its generalized half-direction vector $$\hat{h}_i = \frac{\hat{x}_{i-1} - \hat{x}_i}{\|\hat{x}_{i-1} - \hat{x}_i\|} + \eta \frac{\hat{x}_{i+1} - \hat{x}_i}{\|\hat{x}_{i+1} - \hat{x}_i\|} \quad (2)$$

is collinear with the normal $\hat{n}_i$. An equivalent way of stating this property is that the projection of $\hat{h}_i$ onto the interpolated coordinate frame $$\hat{c}_i = \begin{pmatrix} \hat{h}_i \cdot \hat{s}_i \\ \hat{h}_i \cdot \hat{t}_i \end{pmatrix} \quad (3)$$

vanishes, e.g., $\hat{c}_i = 0$. A subpath $x_1, \ldots, x_n$ with endpoints $x_1$ and $x_n$ must then satisfy n−2 such constraints (one for each specular scattering event), which may be collected and jointly written as $\hat{c}(u_1, v_1, \ldots, u_n, v_n, t) = 0$, where $\hat{c}: R^{2n+1} \to R^{2(n-2)}$. This equation describes a first-order approximation of an implicitly defined 5-dimensional manifold over light paths embedded in a (2n+1)-dimensional space. Of particular interest are the tangent vectors of this high-dimensional manifold, which express how infinitesimal movements of one vertex affect the rest of the specular chain; these may be obtained via a simple application of the implicit function theorem.

Particular embodiments may select coordinates that parameterize the intermediate vertex positions in terms of the endpoint positions $u_1, v_1, u_n, v_n$ (four dimensions) and time t (one dimension). Let $J_{\hat{c}}$ be the (square) Jacobian matrix of $\hat{c}$ with respect to the remaining coordinates (e.g., the intermediate vertex positions):

$$J_{\hat{c}} = \left( \frac{\partial \hat{c}(0)}{\partial u_2}, \frac{\partial \hat{c}(0)}{\partial v_2}, \ldots, \frac{\partial \hat{c}(0)}{\partial u_{n-1}}, \frac{\partial \hat{c}(0)}{\partial v_{n-1}} \right). \quad (4)$$

Then the desired tangent vectors are given by the columns of $$T = -J_{\hat{c}}^{-1} \left( \frac{\partial \hat{c}(0)}{\partial u_1}, \frac{\partial \hat{c}(0)}{\partial v_1}, \frac{\partial \hat{c}(0)}{\partial u_n}, \frac{\partial \hat{c}(0)}{\partial v_n}, \frac{\partial \hat{c}(0)}{\partial t} \right). \quad (5)$$

The involved derivatives are simple to evaluate using automatic differentiation. Particular embodiments use a dense LU factorization for the linear system solve in Eq. (5), which could be optimized to take advantage of the block tridiagonal structure of $J_{\hat{c}}$ for large n. However, in some embodiments, this may be unnecessary as $n \leq 8$ in most cases (n=8 was required to track quadruple refraction paths in FIG. 14). Note that n is only related to the depth of the decomposition, not the total path depth used in the scattering simulation.

Particular embodiments incorporating ME may use a sequence of alternating extrapolation and projection steps to accurately solve for path configurations; the projection step effectively re-traces the linearly extrapolated path starting from the camera $x_1$, which either fails or produces a corrected light path that satisfies all specular constraints. A simple repetition of these two steps leads to a Newton-like method with quadratic convergence close to the solution. As with standard Newton methods, it is helpful to use an adaptive step size criterion to ensure that the linearity assumption is sufficiently satisfied. On a typical frame of the example scene shown in FIG. 1, the average number of spatial and temporal iterations were 3.72 and 1.37, respectively.

Particular embodiments evolve a light path $x_1, \ldots, x_n$ from time t to t+1 such that the endpoints $x_1$ and $x_n$ remain firmly attached to the underlying objects. Particular embodiments achieve this using two nested solves: the inner loop is a standard (e.g., non-temporal) manifold walk invoked at time t<t'≤t+1 to ensure that the endpoint vertices are at their target positions $x_1(t')$ and $x_n(t')$. The outer loop is a temporal manifold walk, which advances the path forward in time and ensures that it remains in a valid configuration (though the endpoints may shift). Combined, they lead to a final set of positions at time t+1 which enables evaluation of the change in position of the first vertex as seen from the camera, e.g., $x_2(t+1) - x_2(t)$, and project it into image space to obtain the final motion vector $v_f(p)$, where $p \in \Omega$ denotes a pixel position in the 2D image domain a The entire process may be fast compared to Monte Carlo rendering, since only a few rays need to be traced per pixel. Particular embodiments may result in highly accurate motion vectors with re-projection errors in the order of machine precision whenever a light path could be successfully tracked from one frame to the other. Particular embodiments flag light paths that could not be tracked or that do not exist in one of the frames, so that image-based methods may treat them accordingly, e.g., by re-computing the associated pixels in a final sparse rendering pass following frame interpolation.

Figure 6A:
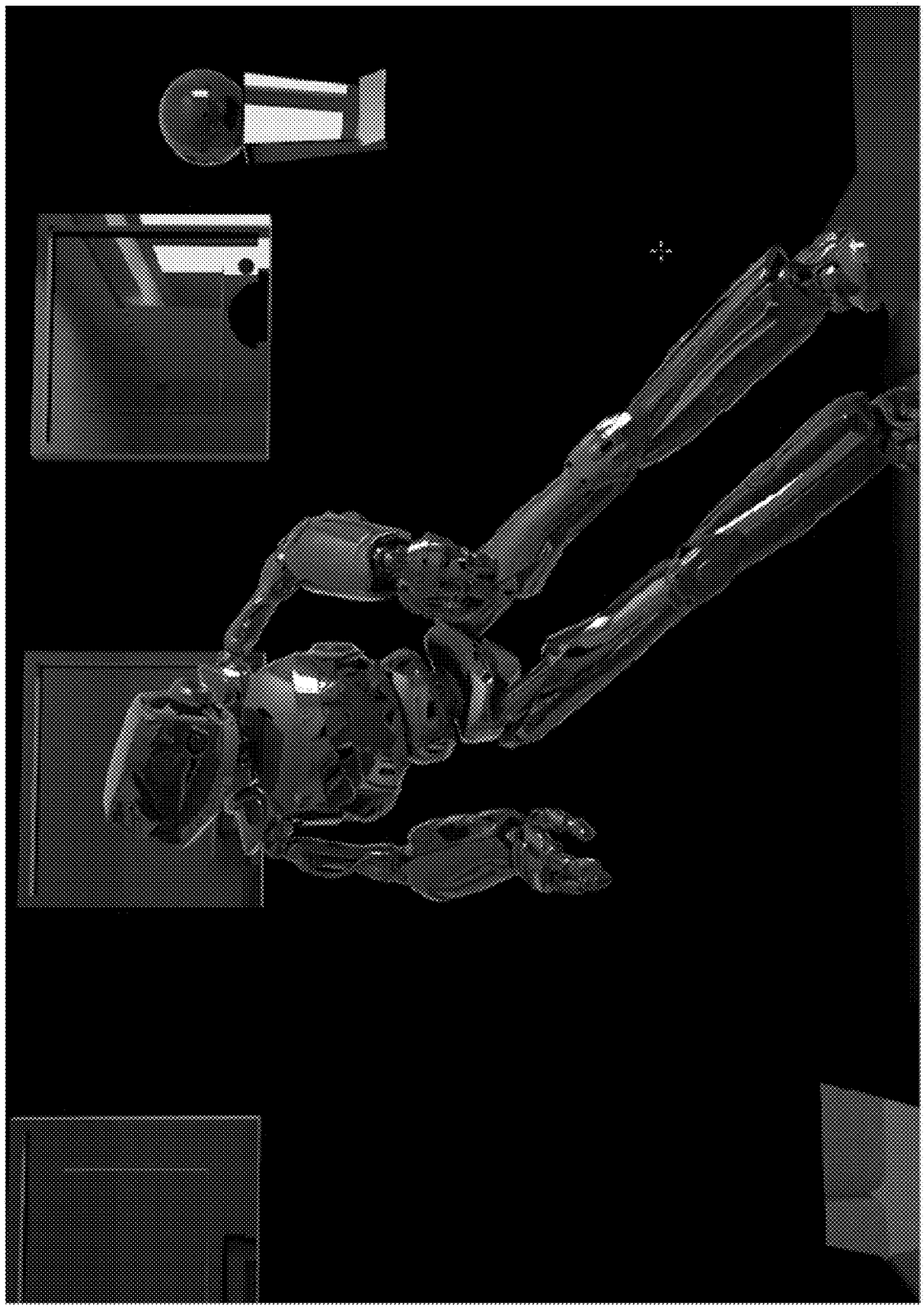
FIGS. 6A-6B illustrate an example specular reflection color component and its motion vectors for the scene decomposition of FIG. 2.
Figure 6B:
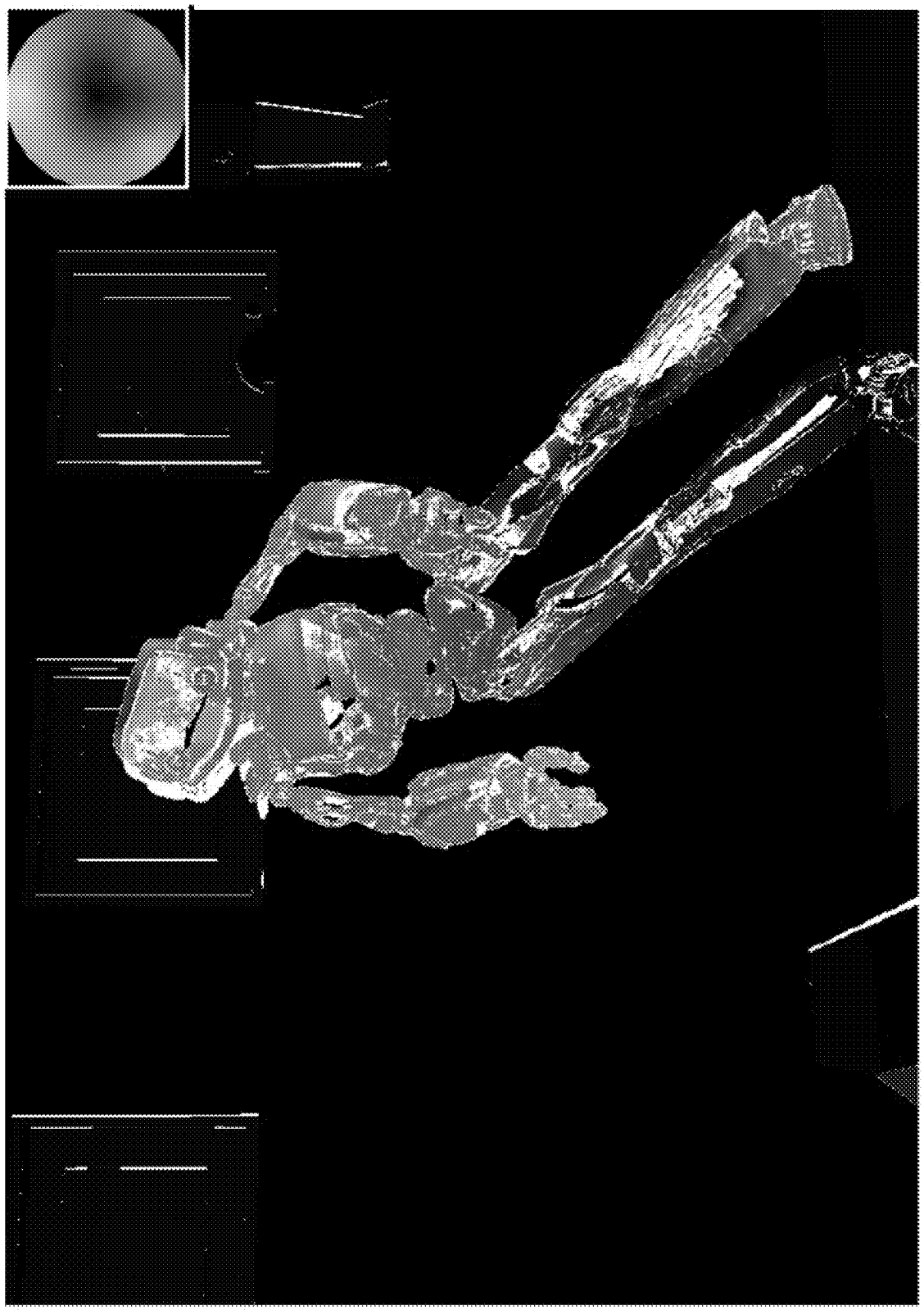

FIGS. 6A-6B illustrate an example specular reflection component and matching motion vectors found using Manifold Exploration. In this example, white pixels mark light paths which cease to exist or cannot be tracked to the next frame. When interpolating frames, particular embodiments may flag and re-compute these pixels using a second sparse rendering phase.

Motion in the irradiance components is the result of time variation in a complex multiple scattering process. For the residual component ($\stackrel{\downarrow}{=}$), motion vectors are equally challenging to compute within the renderer due to the large variety of averaged path space components. For both of these components, particular embodiments may resort to image-based optical flow to estimate motion vectors.

Figure 7C:

Particular embodiments may need to handle large displacements due to fast object or camera motion, which are known to degrade the robustness of optical flow estimation. To this end particular embodiments leverage the primary flow to bootstrap the flow computation via motion compensation. FIGS. 7A-7C illustrate example aspects of performing optical flow-based motion estimation for the irradiance component (FIG. 7A). Using the primary motion vectors, particular embodiments perform a motion compensation by warping the second keyframe (FIG. 7B) where white pixels mark occlusions. The warping may be achieved by performing a backward lookup, which compensates for camera and object motion. The remaining motion (e.g., resulting flow shown in FIG. 7C) is due to secondary effects such as moving shadows, and may be robustly estimated using optical flow. Adding these motion vectors to the primary motion vectors then gives the final motion vectors between the frames.

Particular embodiments may also detect occlusions by a forward-backward consistency check that tests whether by following the (forward) motion vector and its corresponding backward motion vector one ends more than 0.1 pixels away from the original position. For the irradiance components, particular embodiments perform the optical flow computation in the logarithmic domain, where shadows at different brightness levels may be better distinguished.

Figure 8A:
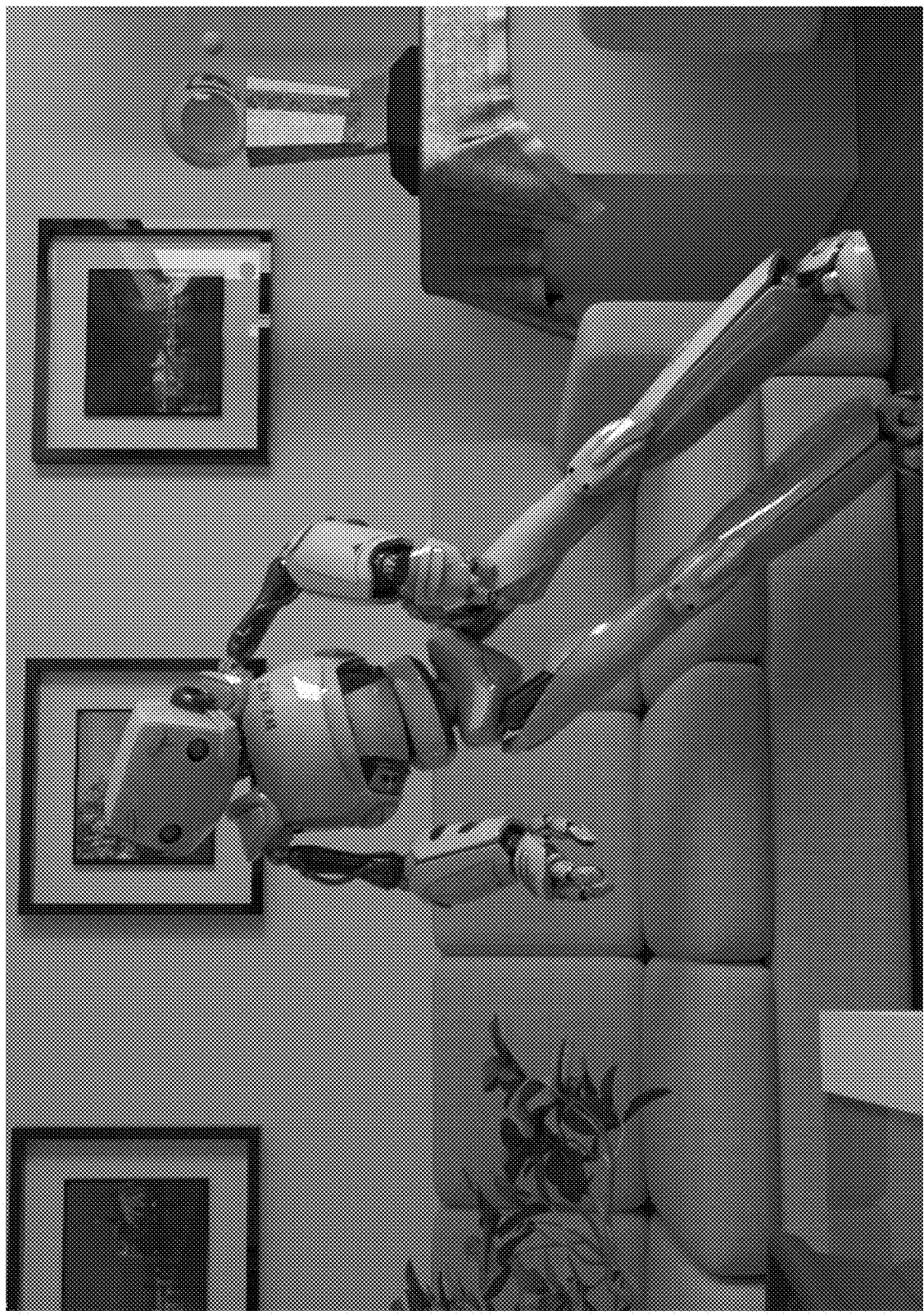
FIGS. 8A-8B illustrate example aspects of silhouette detection for the scene decomposition of FIG. 2.
Figure 8B:
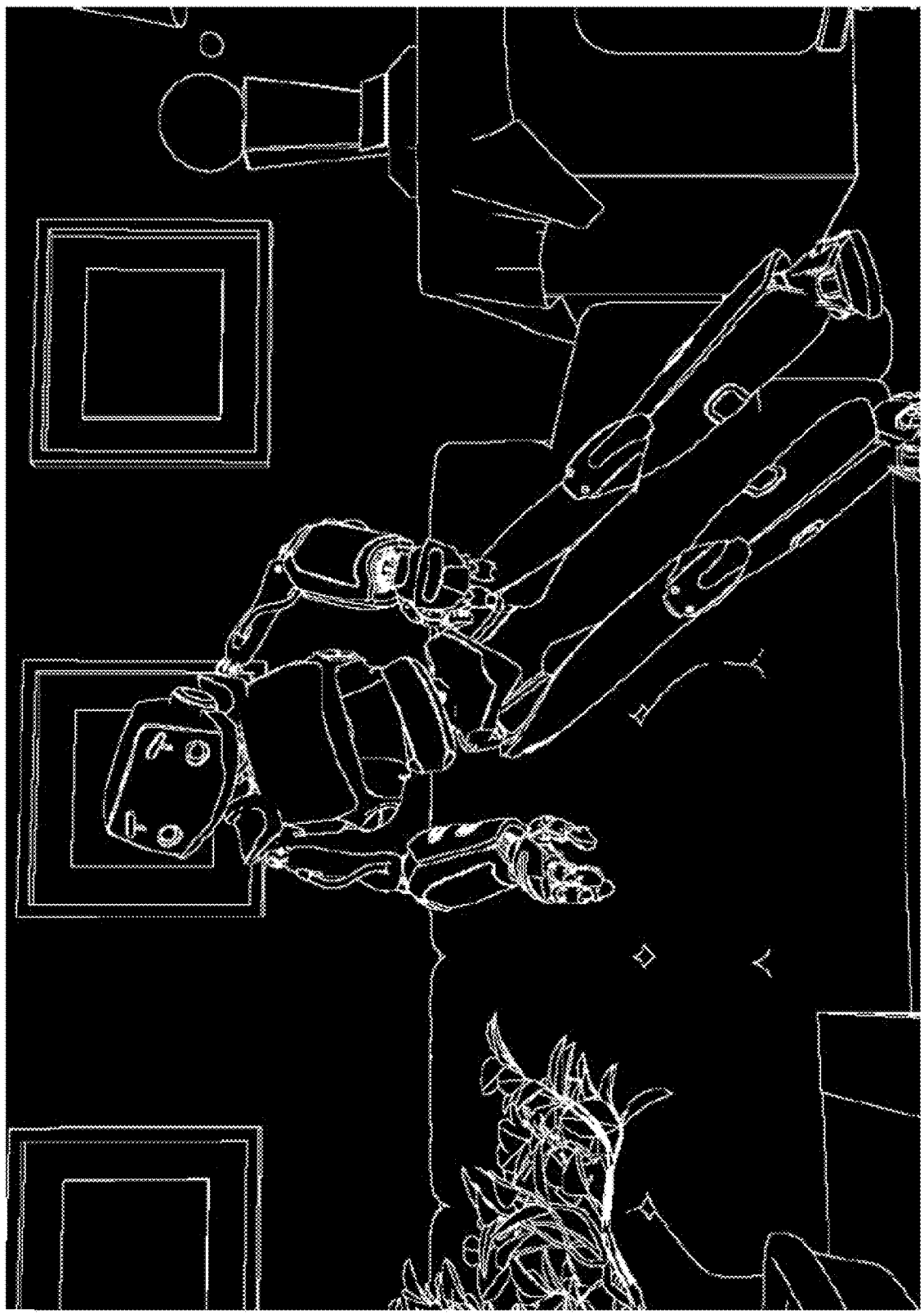

FIGS. 8A-8B illustrate example aspects of silhouette detection for the scene decomposition of FIG. 2. Silhouette pixels capture light from both foreground and background, which makes it impossible to define a single unique motion vector there. As shown in FIGS. 8A-8B, particular embodiments may detect silhouettes and ignore the corresponding (competing) motion vectors for image-based methods, e.g., by treating them like untracked motion vectors in the specular flow (see, e.g., FIGS. 6A-6B). Silhouettes may be detected as sign differences in the dot product of adjacent faces with the direction to the camera and rasterized as 3D lines. A similar technique may be applied to occlusions, where image-space motion vectors would describe the motion of the occluded background points, which leads to artifacts when used for image-based methods. Particular embodiments therefore detect occlusions as mentioned before and also ignore motion vectors there.

Overall Workflow

Figure 9:
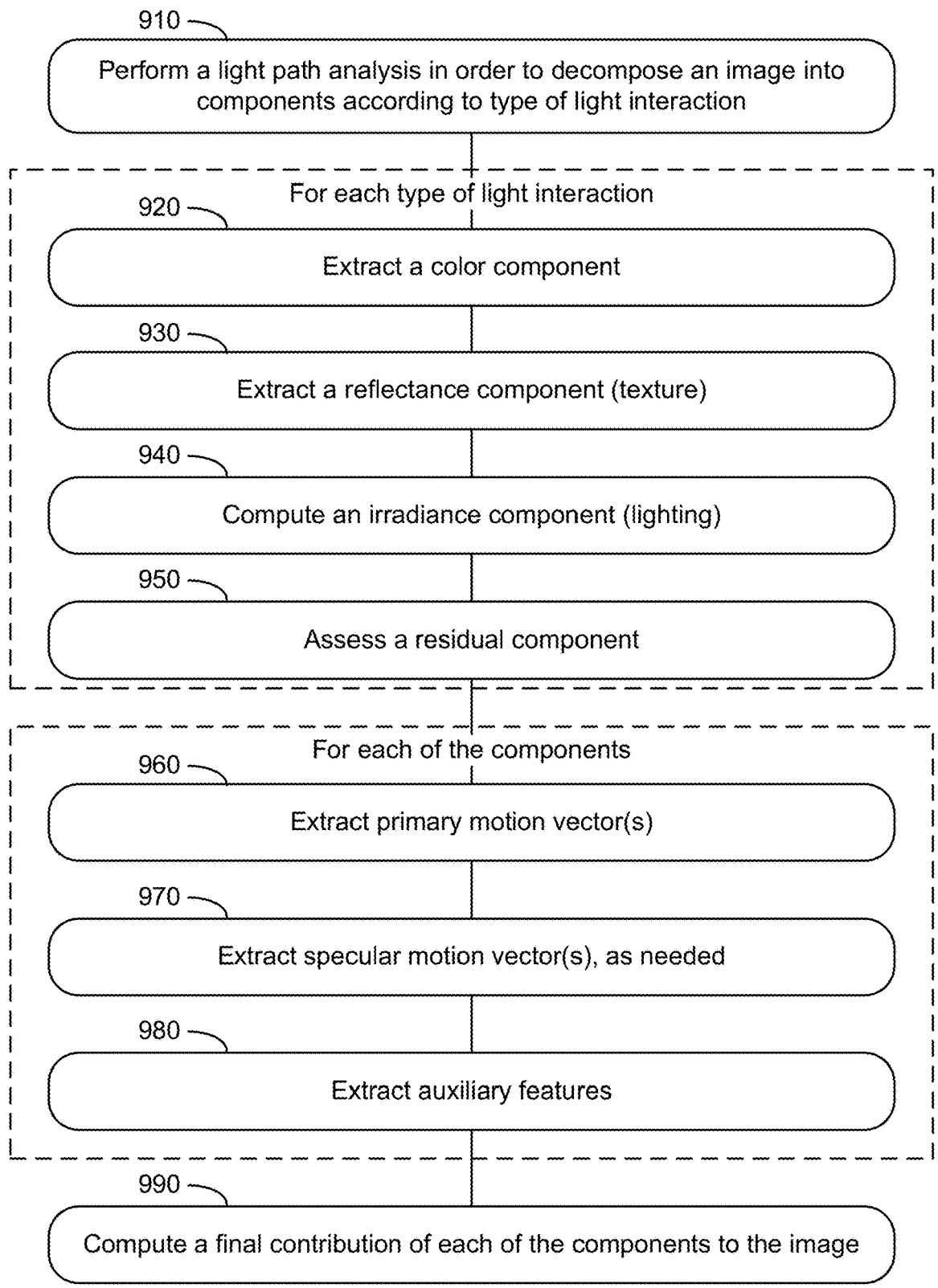
FIG. 9 illustrates an example method for decomposing an image of a scene into components corresponding to disjoint subsets of the space of light paths in the scene.

FIG. 9 illustrates an example generalized method 900 for decomposing an image of a scene into components corresponding to disjoint subsets of the space of light paths in the scene.

In step 910, particular embodiments perform a light path analysis in order to decompose an image (e.g., a frame of a video clip) into components according to a type of light interaction. In particular embodiments, the types of light interaction may include a (direct or indirect) diffuse scattering, a specular or glossy reflection, or a specular or glossy transmission. In particular embodiments, the types of light interaction may include sequences of types of light interaction.

For each type of light interaction (e.g., diffuse scattering, specular reflection, specular transmission), steps 920-940 may decompose the image into components. In step 920, particular embodiments extract a color component representing a contribution by the respective type of light interaction to color for the scene. In step 930, particular embodiments may extract a reflectance component representing a contribution by the respective type of light interaction to texture for the scene. In step 940, particular embodiments may compute an irradiance component representing a contribution by the respective type of light interaction to lighting for the scene. In step 950, particular embodiments assess a residual component for the image, representing a contribution by all unmatched paths to lighting for the scene.

For each of the components, steps 960-970 may extract motion vectors for each of the components. In step 960, particular embodiments extract primary motion vectors to estimate motion of shaded objects in the scene. In step 970, particular embodiments extract specular motion vectors (if applicable) to estimate apparent motion of objects observed through a sequence of specular reflection or refractions. Extraction of specular motion vectors may comprise performing temporal manifold exploration of light paths in a component for a type of specular light interaction, where the light paths commence with a point at which the "eye" (e.g., the camera) is located, and wherein endpoints of the light paths remain attached to their underlying objects in the scene. The temporal manifold exploration of the light paths may proceed only until a first non-specular interaction or light source is encountered.

In particular embodiments, an image-based optical flow may be generated to compute motion vectors for the residual component. Any remaining motion due to secondary effects (after motion due to the primary motion vectors has been eliminated) may be robustly estimated using optical flow. Adding these motion vectors to the primary motion vectors then gives the final motion vectors between the frames. (In particular embodiments, an image-based optical flow may also be generated to calculate motion vectors for an irradiance component.)

In step 980, particular embodiments extract auxiliary features for each of the components (or for only those components for which motion vectors are to be determined based on an image-based optical flow. Such auxiliary features may include, by way of example and not limitation, reflectance, surface normal, surface color, depth (distance) from camera, and emitted radiance.

In step 990, particular embodiments compute a final contribution of each of the components to the image. In particular embodiments, prior to computing the final contribution of each of the components, each component may be processed for denoising, spatial upsampling, and/or interpolation of frames.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Applications: Denoising

For denoising, particular embodiments may utilize a joint NL-means filtering approach, which computes the denoised value $\hat{u}_i(p)$ of a pixel p in a color image $u=(u_1, u_2, u_3)$ as a weighted average of pixels in a square neighborhood $N(p)$ centered on p:

$$\hat{u}_i(p) = \frac{1}{C(p)} \sum_{q \in N(p)} u_i(q) w(p, q), \qquad (6)$$

where i is the index of the color channel, where w(p, q)=min($w_c$(p, q);$w_f$ (p, q)) combines a color weight $w_c$ computed on the color buffer and a feature weight $w_f$, and where C(p) is a normalization factor:

$$C(p) = \sum_{q \in N(p)} w(p, q). \qquad (7)$$

If multiple auxiliary features are available, then $w_f$ is the minimum of the feature weights. A neighboring pixel q may therefore be given a high weight only if it is similar to p according to the color and each auxiliary feature.

Particular embodiments may directly leverage decomposition for a joint NL-Means denoising since, for each component, the final color is rendered, as well as the reflectance, normal, and object ID auxiliary features. Particular embodiments may separately denoise the effective irradiance of each component. The color weight $w_c$ is computed on the irradiance buffer, and the feature weight $w_f$ is computed on the normal and object ID buffers. Once the irradiance is denoised, particular embodiments multiply back the corresponding reflectance buffer to obtain the denoised component color. All denoised components are finally summed up to yield the denoised rendering.

Figure 10:
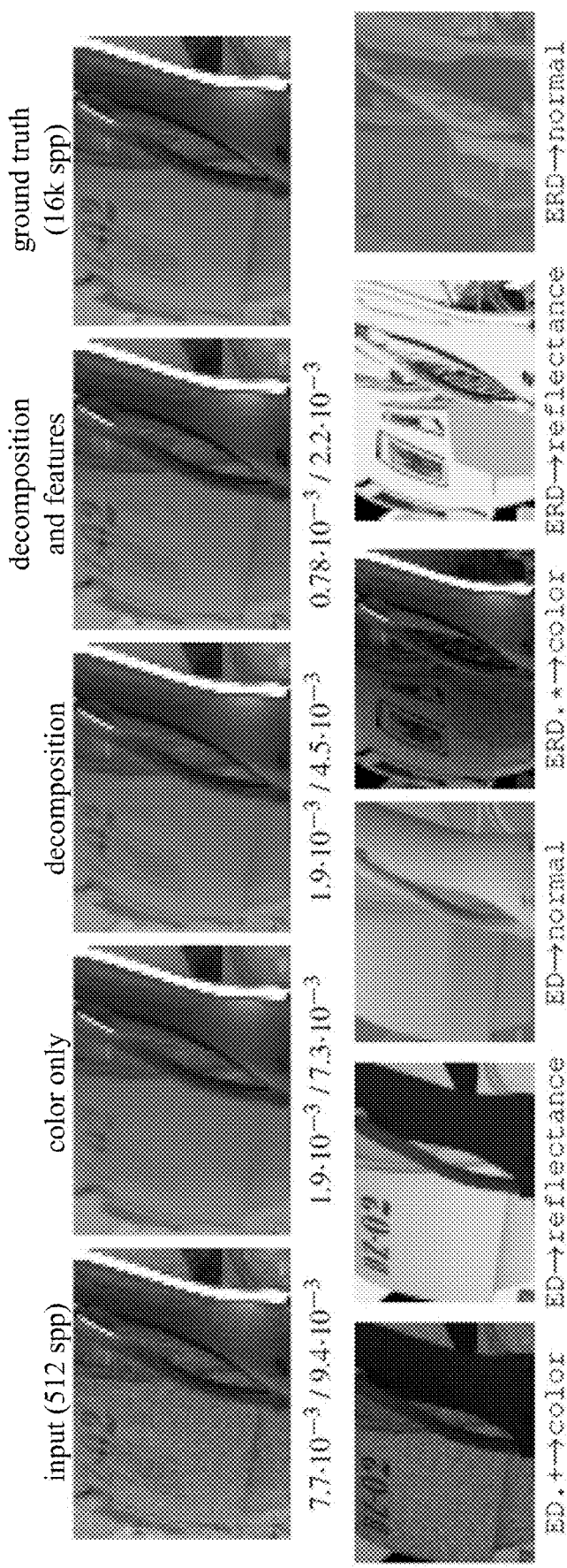
FIG. 10 illustrates results of denoising an image using embodiments disclosed herein.
Figure 11:
FIG. 11 illustrates a comparison of results of denoising an image using known techniques versus results of denoising an image using embodiments disclosed herein.

As shown in FIGS. 10 and 11, using standard techniques, a filter bank of three joint NL-Means filters was computed and combined on a per-pixel basis. One filter was more sensitive to color differences, one more sensitive to auxiliary feature differences, and a third one more balanced. Particular embodiments described herein opted to use a single balanced filter. Combined with decomposition, this simplified denoising scheme may offer a better trade-off between quality and complexity (see FIGS. 10 and 11 for results using both embodiments described herein and more traditional techniques).

Particular embodiments may utilize spatio-temporal filtering to alleviate residual low-frequency noise that can lead to highly noticeable large-scale flickering in denoised animation sequences. Extending a joint NL-Means filter to the spatio-temporal domain is easily achieved by augmenting the filtering window to include data from temporally adjacent frames. However, one needs to account for camera and scene motion to be able to leverage the coherence from frame to frame in an optimal way. To this end, particular embodiments warp every component of adjacent frames, as well as the corresponding feature buffers, using the computed per-component motion vectors, which aligns them to the current frame. When denoising the irradiance, particular embodiments use the computed geometry motion vectors of the corresponding component (ED.*, ERD.*, or ETTD.*), where the motion of moving shadows is not captured over time. However, the robust NL-Means weights ensure that shadows are not excessively blurred despite the misalignment. From the denoised irradiance components, motion vectors can then be computed and used in other applications, such as frame interpolation.

Particular embodiments may perform denoising by utilizing symmetric and/or asymmetric distances to calculate feature weights for certain auxiliary features, such as the normal and/or depth features. Particular embodiments may perform variance cancellation and normalization on a per pixel basis by calculating an asymmetric distance between neighbors p and q:

$$d_i^2(p, q) = \frac{(u_i(p) - u_i(q))^2 - \alpha(Var_i[p] + Var_i[q, p])}{\epsilon + k^2(Var_i[p] + Var_i[q])}, \qquad (8)$$

where a per pixel variance of a color channel i at pixel p is denoted by $Var_i[p]$, and where $\alpha$ controls the strength of variance cancellation.

Particular embodiments may calculate a symmetric distance between two neighbors by defining a modified distance to a pair of symmetric neighbors $q_1$ and $q_2$:

$$d_i^2(p, \bar{q}) = \frac{(u_i(p) - u_i(\bar{q}))^2 - (Var_i[p] + Var_i[p, \bar{q}])}{Var_i[p] + Var_i[\bar{q}]}, \qquad (9)$$

where $u_i(\bar{q}) = (u_i(q_1) + u_i(q_2))/2,$ $Var_i[\bar{q}] = (Var_i[q_1] + Var_i[q_2])/4,$ $Var_i[p, \bar{q}] = (Var_i[p, q_1] + Var_i[p, q_2])/4.$ Some embodiments may use symmetric distance when it is determined to be less than the average of the asymmetric distance to both neighbors $q_1$ and $q_2$.

Some embodiments may select either symmetric distance, conventional distance, or a blend thereof when calculating the feature weights. Some embodiments may use only symmetric distance when it is smaller than a configured proportion (e.g., 0.2) of the average of asymmetric distances to $q_1$ and $q_2$. Some embodiments may use only asymmetric distance when the symmetric distance is greater than a configured proportion (e.g., 0.5) times the average of asymmetric distances to $q_1$ and $q_2$. Some embodiments may use a combination of symmetric distance and asymmetric distance(s) in all other cases not covered by the two described above (e.g., when the symmetric distance is between 0.2 and 0.5).

FIG. 10 compares different denoising results while progressively leveraging more information from the decomposition performed according to embodiments described herein. Denoising may be significantly more robust when leveraging embodiments described herein. When adding the auxiliary features for a joint NL-Means filtering, particular embodiments may achieve denoising results that are visually very close to a high sample-count ground truth rendering with a low relative mean-square error (MSE). As illustrated in the top row: NL-Means filtering the final color ("color only") yields a smooth but blurry output; NL-Means filtering each component separately ("decomposition") yields sharper reflections, but low-contrast texture details, such as the text printed on the torso, are still problematic; joint NL-Means filtering of each component guided by auxiliary features ("decomposition and features") robustly recovers fine details in the scene and yields a result close to the ground truth. (FIG. 10 also shows an example of the relative mean-square error ("MSE") of each image for the full frame (first value) and the crop shown (second value)). The bottom row illustrates some of the used components and features: noisy data and corresponding reflectance and normal buffers for the indirect diffuse component (left three images) and the specular reflection component (right tree images), showing how the decomposition succeeds in capturing the distinct noise characteristic and spatial structure of the previously composited shading effects.

FIG. 11 illustrates a comparison of results of denoising an image using previously-known techniques (left panel) versus results of denoising an image using embodiments disclosed herein (right panel). Even with the used simple denoising method, decomposition using embodiments described herein brings a significant improvement, both qualitatively and quantitatively, as measured by the relative MSE (which was computed on the full frame).

Figure 12:
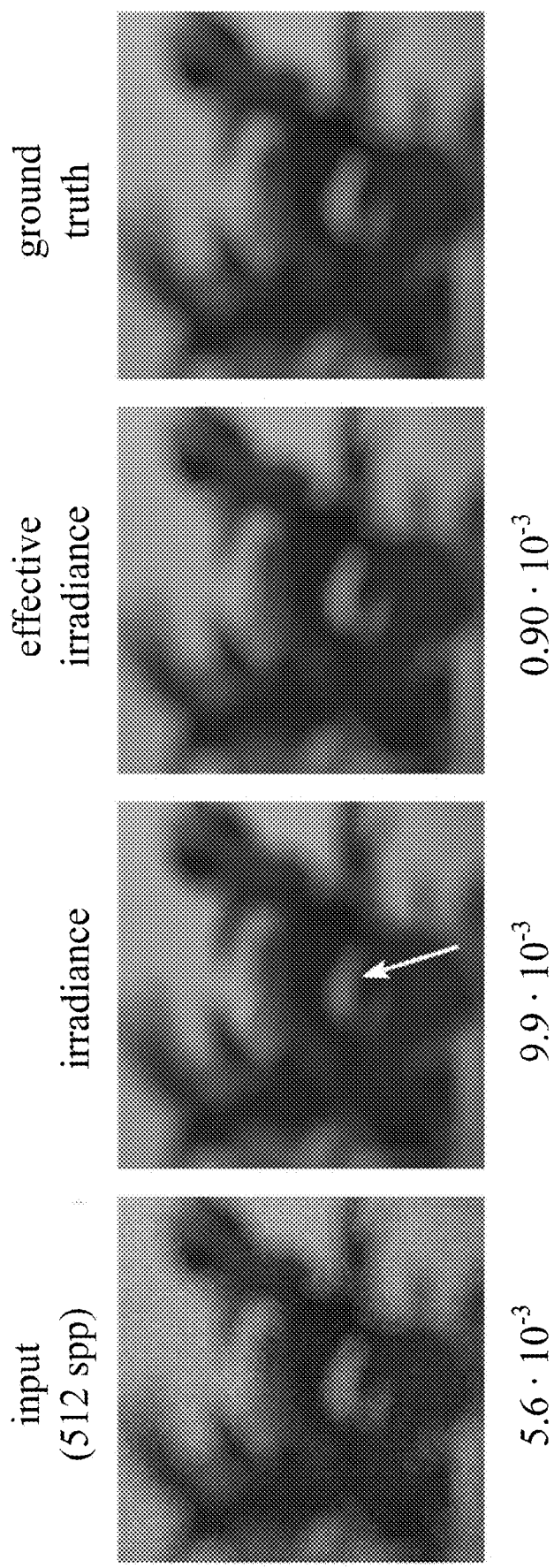
FIG. 12 further illustrates a comparison of results of denoising an image using known techniques versus results of denoising an image using embodiments disclosed herein.

FIG. 12 further illustrates a comparison of results of denoising an image using known techniques versus results of denoising an image using embodiments disclosed herein. Effective irradiance factorization may be used in cases where the standard irradiance factorization is invalid. This notably occurs when using spatial antialiasing and in the presence of distribution effects such as depth-of-field or motion blur. All results presented use spatial anti-aliasing. FIG. 12 illustrates a comparison between (1) the output of denoising techniques described herein when adding depth-of-field to the Robot scene and (2) the result obtained using standard irradiance factorization. Note that in this case, the features also exhibit a noticeable amount of noise which requires to pre-filter them.

Applications: Upsampling

Dramatic increases in the pixel count of cinema and home TV have made it prohibitively expensive to render animations for these new formats. This can be alleviated by rendering at a lower resolution, followed by an upsampling step that produces the desired output resolution. Similarly to the improvements achieved for denoising, upsampling each component separately yields tangibly better results, as multiple shading contributions that would normally interfere in the upsampling process can be disambiguated. Additionally, particular embodiments may leverage auxiliary features that can be cheaply computed at the high target resolution to guide the upsampling.

Particular embodiments use a joint upsampling scheme, where the color is upsampled using the features (e.g., reflectance, normal and emitted radiance) as a guide, and each component is upsampled individually. Particular embodiments directly render the image at the target high resolution but with correspondingly fewer samples. All examples were rendered at ¼ of the samples. Particular embodiments then subsample using a 2×2 box filter, which results in a low-resolution image with reduced noise. The subsampled images are denoised, and then upsampled back to the full resolution. This reduces the sampling rate by a factor of four, while keeping the same signal-to-noise ratio in the low-resolution image.

Due to its unconstrained optimization, the guided image filter upsampling can produce negative pixel values, particularly along strong edges. Pixels with negative values are flagged to be re-rendered with a higher sampling count and denoised at the full resolution. In practice, the re-rendering rate is very low. For the Robot scene it varies between 0.14% and 0.28% per frame, with an average of 0.20%.

Figure 13:
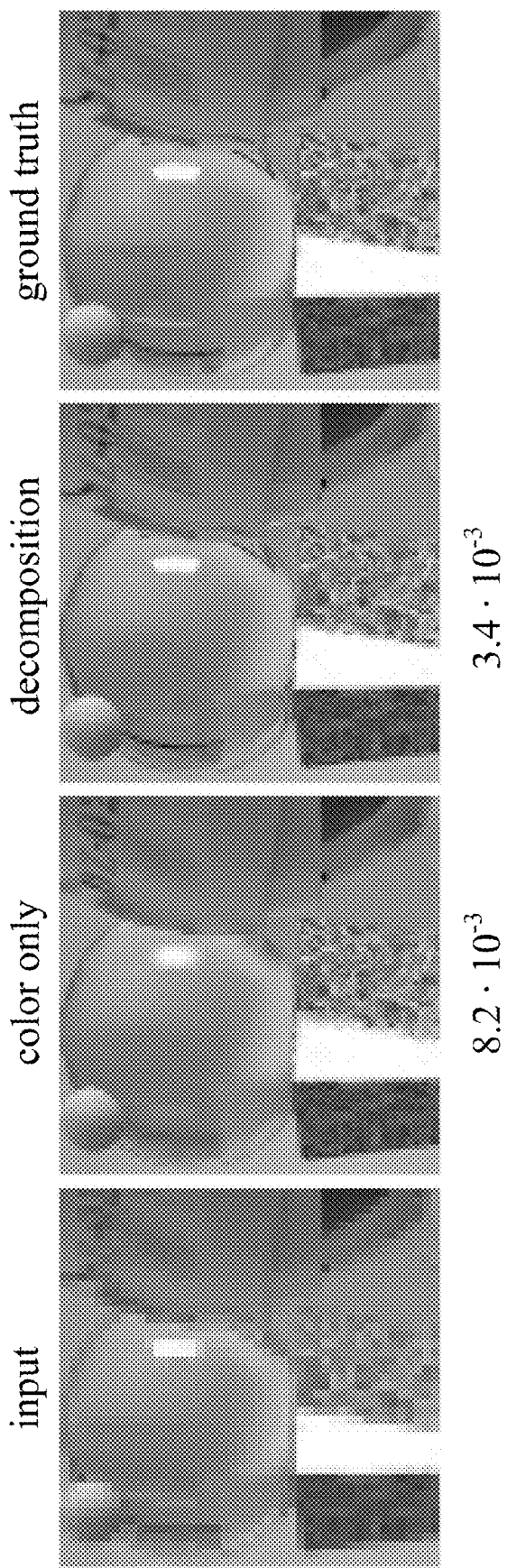
FIG. 13 illustrates results of upsampling an image using embodiments disclosed herein.

FIG. 13 illustrates results of upsampling an image using embodiments disclosed herein. Upsampling a 640×360 rendering at 512 spp ("input") to 1280×720 pixels. Upsampling of the final pixel color guided by the features of the diffuse component ("color only") blurs out secondary effects, such as the refractions in the sphere and the reflections on the robot. Particular embodiments may robustly reconstruct the reflections and refractions by applying the same upsampling scheme on top of the decomposition ("decomposition"), yielding a much lower relative MSE (which was computed on the full frame). The ground truth shown is the denoised full resolution rendering at 512 spp. As shown in FIG. 13, utilizing the common technique of directly upsampling the final colors results in loss of significant detail. While it correctly reconstructs the diffuse shading, it fails to correctly reconstruct secondary effects, such as reflections and refractions. In contrast, the same upsampling scheme applied on each component of the decomposition and guided by the features yields a significantly improved result, with correct reflections and refractions, and a drastically reduced relative MSE.

Applications: Frame Interpolation

Frame interpolation proceeds by projecting pixels rendered at sparse keyframes to in-between frames using corresponding motion vectors. To improve results one can use motion vectors computed forward and backward in time, and average the contributions from the two neighboring keyframes, weighted by their distance to the interpolated frame.

Particular embodiments interpolate each component separately using the corresponding motion vectors. This remedies ghosting artifacts that appear in the presence of complex secondary effects such as reflections and refractions where a single pixel receives contributions from various sources that might all undergo different motions.

As particular embodiments compute specular motion vectors at the final frame rate, they are defined between subsequent frames. For interpolation, motion vectors need to be defined between keyframes and the current in-between frame, which may be achieved by concatenating the motion vectors. The same applies to the primary motion vectors used for the diffuse reflectance component. For the irradiance and residual components, particular embodiments compute motion vectors between the keyframes using optical flow and thus scale these motion vectors with regard to the position of the in-between frame.

There are several reasons why it can be necessary to re-render some pixels in the interpolated frames in a second sparse render pass: Some specular paths cease to exist or cannot be tracked over time, which leads to unknown pixels in the specular motion vectors. Particular embodiments may also ignore motion vectors of silhouette pixels as they may capture objects with conflicting motion. Such undefined motion vectors result in holes in the interpolated frame, which need to be filled by re-rendering. Holes are also caused by pixels that are occluded in both keyframes, but become visible in the in-between frames. Finally, if the illumination changes noticeably, a seam can occur between disocclusions where only a single keyframe contributes and the neighboring regions where contributions from two keyframes are averaged, making it necessary to also re-render the disoccluded region in such cases.

Figure 14:
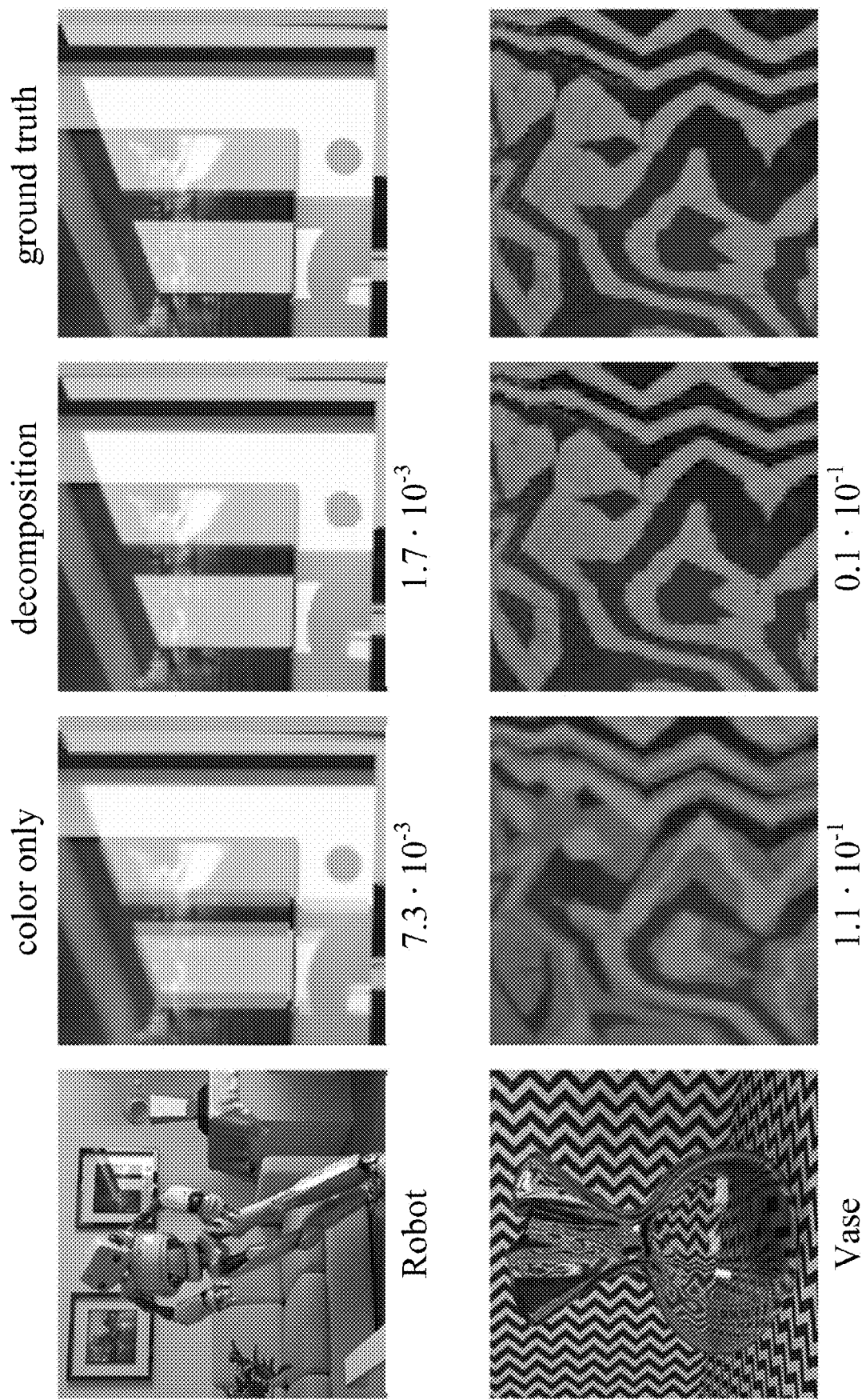
FIG. 14 illustrate results of interpolating frames for two different images with challenging specular effects using embodiments disclosed herein.

FIG. 14 illustrates results of interpolating frames for two different images with challenging specular effects using embodiments disclosed herein. The crop of the Robot scene (top) shows the handling of reflections (ERD.*) whereas the Vase scene (bottom) showcases a highly complicated four-fold specular transmission (ETTTTD.*). The color only baseline method (second column) interpolates the final colors using the primary motion vectors, yielding strong artifacts and a high relative MSE (which is computed for the full frame). Three in-between frames were interpolated for both scenes.

In FIG. 14, particular embodiments show that using decompositions and the corresponding motion vectors resolves the ghosting at specular effects that occur when interpolating the final colors only using the primary motion vectors.

Figure 15A:
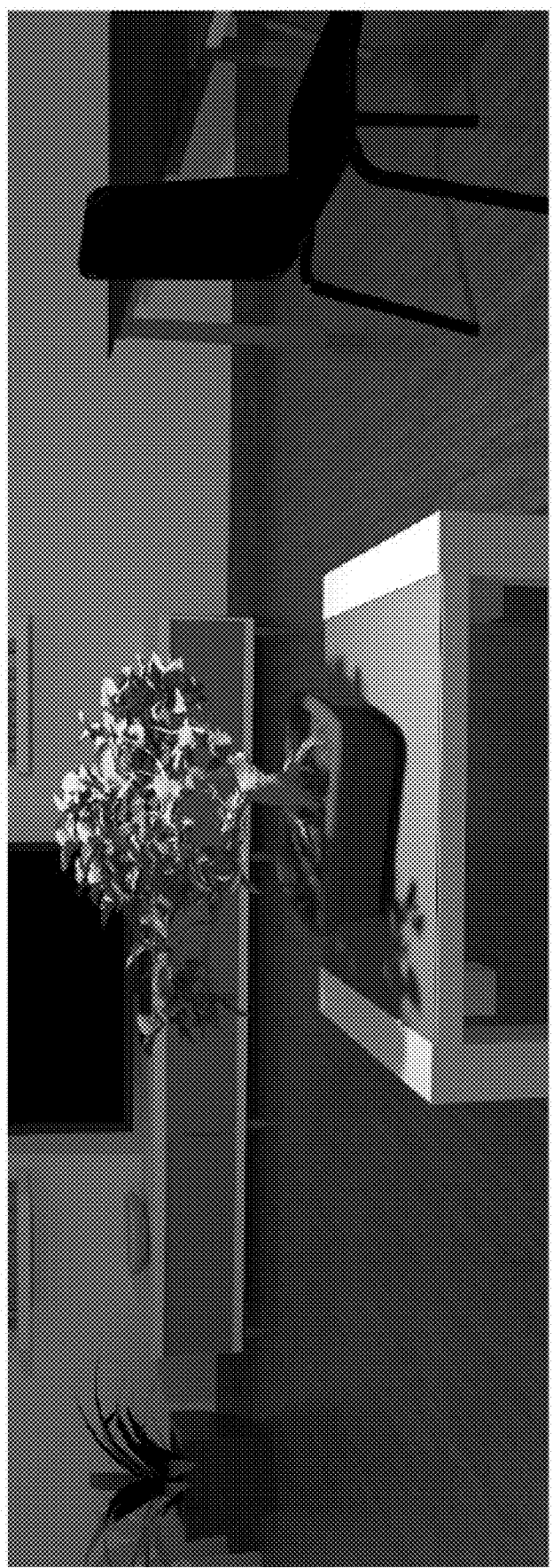
FIGS. 15A-15B illustrate results of interpolating frames for an image with challenging moving shadows using embodiments disclosed herein.
Figure 15B:
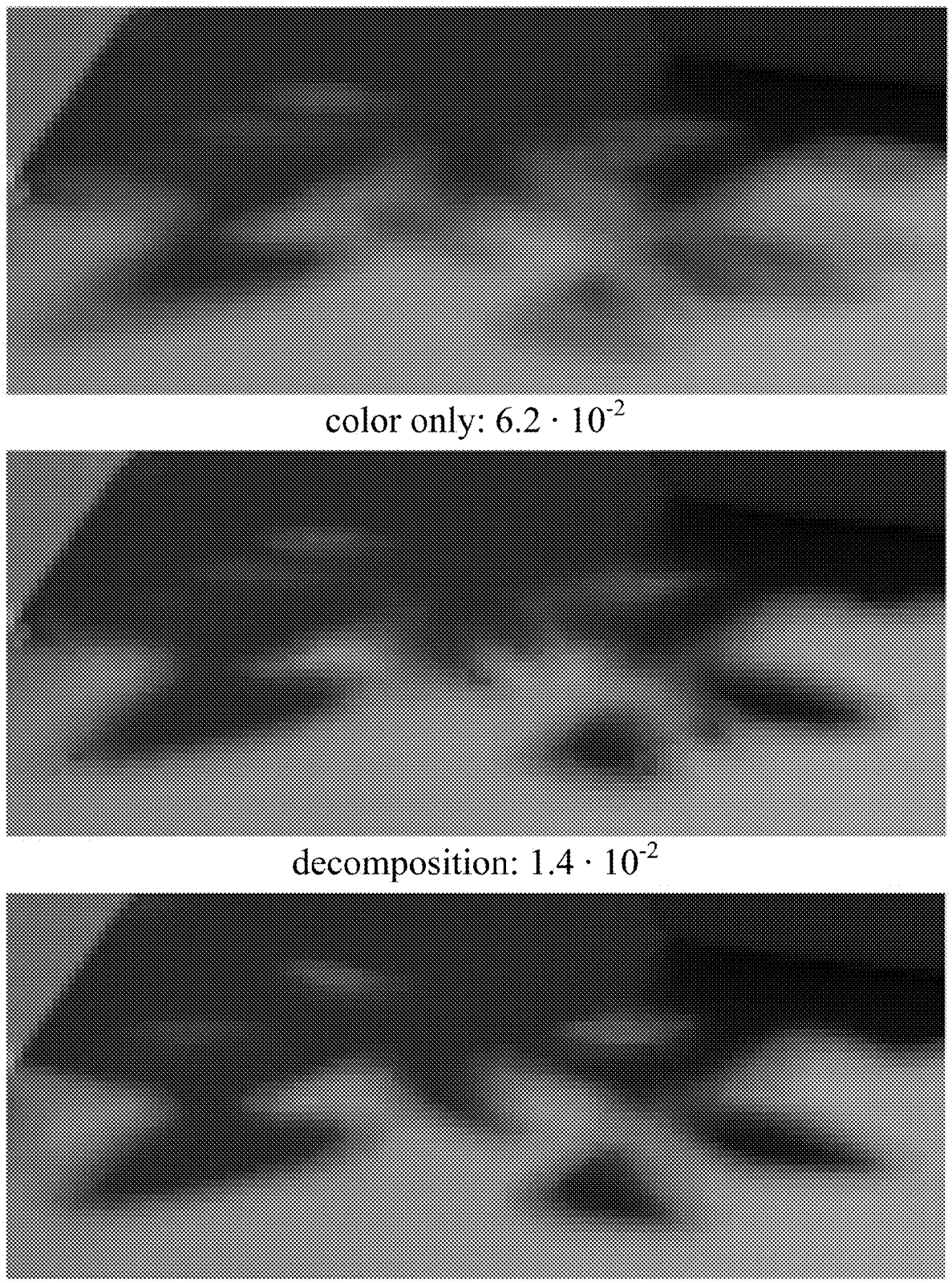

FIGS. 15A-15B illustrate results of interpolating frames for an image with challenging moving shadows using embodiments disclosed herein. These are captured in the diffuse irradiance and the residual components and their motion vectors may be estimated using optical flow. The baseline method (color only) leaves halos whereas the techniques described herein of interpolating the irradiance and residual components separately using the estimated motion vectors significantly reduces these artifacts and lowers the relative MSE (computed on the full frame).

For highly glossy objects, specular motion vectors may be computed the same way as for ideally smooth ones, e.g., by pretending that they are smooth when running the Manifold Exploration. This is based on an empirical observation that the effective motion in the smooth and glossy case is almost identical, even though the appearance in the rendering may significantly deviate.

Figure 16:
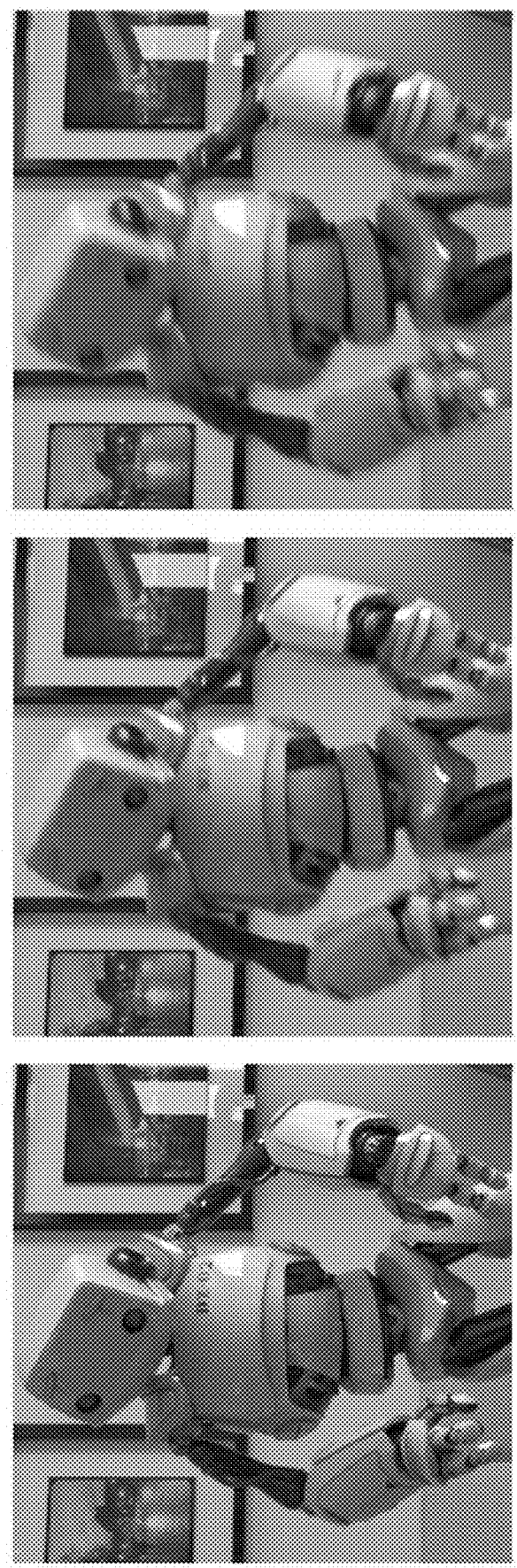
FIG. 16 illustrate simulation of motion blur using embodiments disclosed herein.

FIG. 16 illustrates simulation of motion blur using per-component motion vectors to simulate different amounts of motion blur as a post-process. Particular embodiments may also use the computed motion vectors to add motion blur as a post-process by integrating (splatting) the pixel colors of each component along the motion vectors. As shown in FIG. 16, this not only produces realistic motion blur, but also allows us to easily control the amount of blur, e.g., the virtual exposure time, after rendering. Particular embodiments may fill pixels with undefined specular motion vectors (see, e.g., FIG. 6B) using standard image inpainting.

Table 1 shows the speedups achieved by several combinations of techniques described herein on the example Robot scene, running a CPU implementation on a cluster. Storing the decomposition incurs a memory overhead proportional to its granularity. The data is stored in compressed multi-channel EXRs, leveraging that some components have many zero pixels. The frame shown in FIG. 2 is 29 MB in total, where the final pixel color accounts for 3.7 MB.

TABLE 1

Average computation times per input frame.

| Method | Render | Denoise | Upsample | Interpolate | Resolution | Overhead | Rel. Cost |
| --- | --- | --- | --- | --- | --- | --- | --- |
| Base | 178.0 | — | — | — | — | — | — |
| GT | 5696.0 | — | — | — | 1× | 32.0× | 32 |
| D | 208.2 | 5.5 | — | — | 1× | 1.2× | 1.2 |
| DI | 210.8 | 5.4 | — | 172.1 | 4× | 2.2× | 0.55 |
| DU | 61.7 | 1.5 | 12.2 | — | 4× | 1.7× | 0.43 |
| DUI | 64.3 | 1.4 | 11.1 | 131.4 | 16× | 4.7× | 0.29 |

Table 1 shows average computation times per input frame (in core minutes) for the Robot scene shown in FIG. 1 (1280×720 pixels). The noisy baseline render without extracting the decomposition (Base) used 512 samples per pixel ("spp"), whereas an (almost) noise-free ground truth render (GT) required 16 k spp. The last three columns contrast the gain in resolution (due to upsampling or interpolation) vs. the computational overhead compared to the baseline, and give the relative cost as the ratio between the two. As more post-processing steps (Denoising, Upsampling, Interpolation) are combined, the relative cost may be reduced. Note that the Upsample and Interpolate columns also include the re-rendering and denoising of missing pixels, which for the interpolation make up for 90% of the time.

To combine the previously described image-based methods into a single pipeline, particular embodiments may first produce high resolution keyframes by combining denoising and upsampling. Then particular embodiments may interpolate between frames, followed by re-rendering. Particular embodiments may use more advanced blending techniques, e.g., Poisson blending to handle occlusion seams with less re-rendering. Particular embodiments may use an automatic method to determine the components that are needed to best represent a given scene, e.g., by analyzing the materials. This may be supported by a code generation tool that automatically instruments the path tracing integrator for a given decomposition. Particular embodiments may use "deep" buffers to capture and decompose the effects of volumetric light transport for the purpose of compositing.

Figure 17:
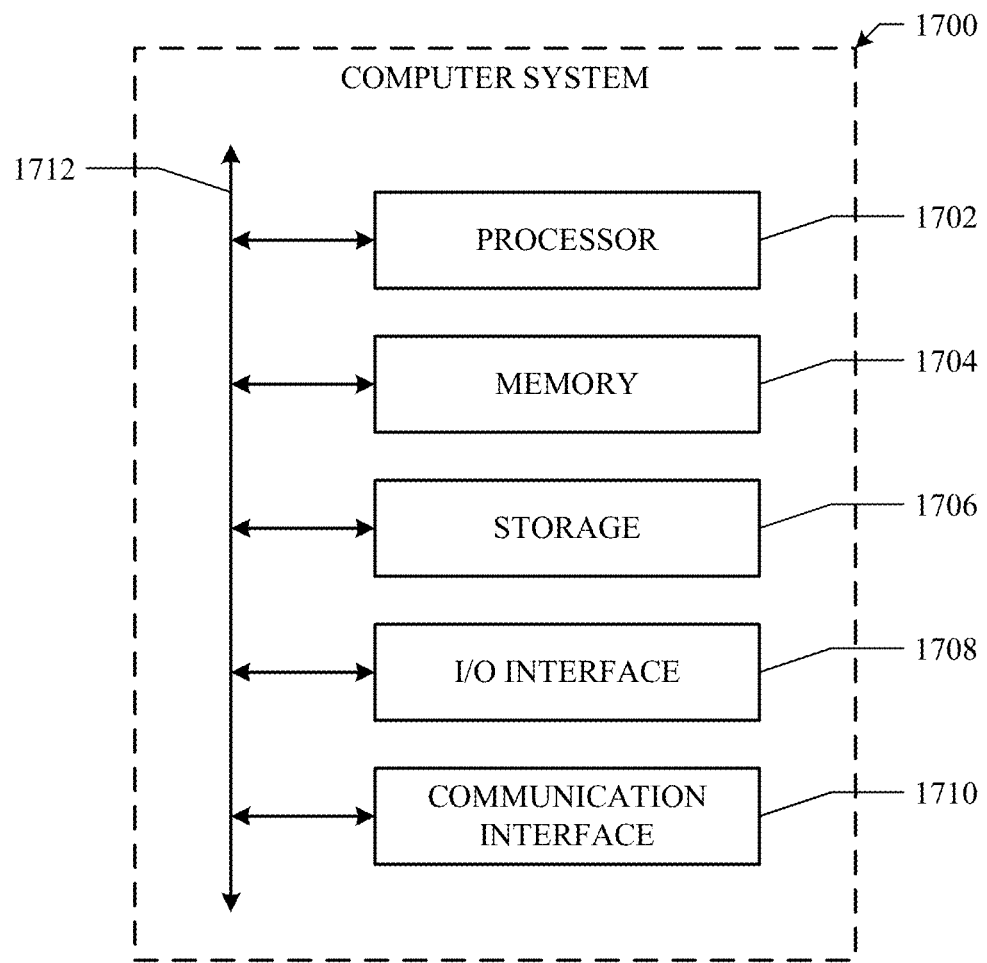
FIG. 17 illustrates an example computer system.

FIG. 17 illustrates an example computer system 1700. In particular embodiments, one or more computer systems 1700 perform one or more steps of one or more methods described or illustrated herein. In particular embodiments, one or more computer systems 1700 provide functionality described or illustrated herein. In particular embodiments, software running on one or more computer systems 1700 performs one or more steps of one or more methods described or illustrated herein or provides functionality described or illustrated herein. Particular embodiments include one or more portions of one or more computer systems 1700. Herein, reference to a computer system may encompass a computing device, and vice versa, where appropriate. Moreover, reference to a computer system may encompass one or more computer systems, where appropriate.

This disclosure contemplates any suitable number of computer systems 1700. This disclosure contemplates computer system 1700 taking any suitable physical form. As example and not by way of limitation, computer system 1700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1700 may include one or more computer systems 1700; be unitary or distributed; span multiple locations; span multiple machines; span multiple data centers; or reside in a cloud, which may include one or more cloud components in one or more networks. Where appropriate, one or more computer systems 1700 may perform without substantial spatial or temporal limitation one or more steps of one or more methods described or illustrated herein. As an example and not by way of limitation, one or more computer systems 1700 may perform in real time or in batch mode one or more steps of one or more methods described or illustrated herein. One or more computer systems 1700 may perform at different times or at different locations one or more steps of one or more methods described or illustrated herein, where appropriate.

In particular embodiments, computer system 1700 includes a processor 1702, memory 1704, storage 1706, an input/output (I/O) interface 1708, a communication interface 1710, and a bus 1712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1702 includes hardware for executing instructions, such as those making up a computer program. As an example and not by way of limitation, to execute instructions, processor 1702 may retrieve (or fetch) the instructions from an internal register, an internal cache, memory 1704, or storage 1706; decode and execute them; and then write one or more results to an internal register, an internal cache, memory 1704, or storage 1706. In particular embodiments, processor 1702 may include one or more internal caches for data, instructions, or addresses. This disclosure contemplates processor 1702 including any suitable number of any suitable internal caches, where appropriate. As an example and not by way of limitation, processor 1702 may include one or more instruction caches, one or more data caches, and one or more translation lookaside buffers (TLBs). Instructions in the instruction caches may be copies of instructions in memory 1704 or storage 1706, and the instruction caches may speed up retrieval of those instructions by processor 1702. Data in the data caches may be copies of data in memory 1704 or storage 1706 for instructions executing at processor 1702 to operate on; the results of previous instructions executed at processor 1702 for access by subsequent instructions executing at processor 1702 or for writing to memory 1704 or storage 1706; or other suitable data. The data caches may speed up read or write operations by processor 1702. The TLBs may speed up virtual-address translation for processor 1702. In particular embodiments, processor 1702 may include one or more internal registers for data, instructions, or addresses. This disclosure contemplates processor 1702 including any suitable number of any suitable internal registers, where appropriate. Where appropriate, processor 1702 may include one or more arithmetic logic units (ALUs); be a multi-core processor; or include one or more processors 1702. Although this disclosure describes and illustrates a particular processor, this disclosure contemplates any suitable processor.

In particular embodiments, memory 1704 includes main memory for storing instructions for processor 1702 to execute or data for processor 1702 to operate on. As an example and not by way of limitation, computer system 1700 may load instructions from storage 1706 or another source (such as, for example, another computer system 1700) to memory 1704. Processor 1702 may then load the instructions from memory 1704 to an internal register or internal cache. To execute the instructions, processor 1702 may retrieve the instructions from the internal register or internal cache and decode them. During or after execution of the instructions, processor 1702 may write one or more results (which may be intermediate or final results) to the internal register or internal cache. Processor 1702 may then write one or more of those results to memory 1704. In particular embodiments, processor 1702 executes only instructions in one or more internal registers or internal caches or in memory 1704 (as opposed to storage 1706 or elsewhere) and operates only on data in one or more internal registers or internal caches or in memory 1704 (as opposed to storage 1706 or elsewhere). One or more memory buses (which may each include an address bus and a data bus) may couple processor 1702 to memory 1704. Bus 1712 may include one or more memory buses, as described below. In particular embodiments, one or more memory management units (MMUs) reside between processor 1702 and memory 1704 and facilitate accesses to memory 1704 requested by processor 1702. In particular embodiments, memory 1704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1704 may include one or more memories 1704, where appropriate. Although this disclosure describes and illustrates particular memory, this disclosure contemplates any suitable memory.

In particular embodiments, storage 1706 includes mass storage for data or instructions. As an example and not by way of limitation, storage 1706 may include a hard disk drive (HDD), a floppy disk drive, flash memory, an optical disc, a magneto-optical disc, magnetic tape, or a Universal Serial Bus (USB) drive or a combination of two or more of these. Storage 1706 may include removable or non-removable (or fixed) media, where appropriate. Storage 1706 may be internal or external to computer system 1700, where appropriate. In particular embodiments, storage 1706 is non-volatile, solid-state memory. In particular embodiments, storage 1706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1706 taking any suitable physical form. Storage 1706 may include one or more storage control units facilitating communication between processor 1702 and storage 1706, where appropriate. Where appropriate, storage 1706 may include one or more storages 1706. Although this disclosure describes and illustrates particular storage, this disclosure contemplates any suitable storage.

In particular embodiments, I/O interface 1708 includes hardware, software, or both, providing one or more interfaces for communication between computer system 1700 and one or more I/O devices. Computer system 1700 may include one or more of these I/O devices, where appropriate. One or more of these I/O devices may enable communication between a person and computer system 1700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1708 for them. Where appropriate, I/O interface 1708 may include one or more device or software drivers enabling processor 1702 to drive one or more of these I/O devices. I/O interface 1708 may include one or more I/O interfaces 1708, where appropriate. Although this disclosure describes and illustrates a particular I/O interface, this disclosure contemplates any suitable I/O interface.

In particular embodiments, communication interface 1710 includes hardware, software, or both providing one or more interfaces for communication (such as, for example, packet-based communication) between computer system 1700 and one or more other computer systems 1700 or one or more networks. As an example and not by way of limitation, communication interface 1710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1710 for it. As an example and not by way of limitation, computer system 1700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1700 may include any suitable communication interface 1710 for any of these networks, where appropriate. Communication interface 1710 may include one or more communication interfaces 1710, where appropriate. Although this disclosure describes and illustrates a particular communication interface, this disclosure contemplates any suitable communication interface.

In particular embodiments, bus 1712 includes hardware, software, or both coupling components of computer system 1700 to each other. As an example and not by way of limitation, bus 1712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1712 may include one or more buses 1712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing systems:
    performing a light path analysis of an image comprising a scene, wherein the scene comprises at least one refractive or reflective object;
    for each of a plurality of pixels in the image:
        decomposing a color of the pixel based on the light path analysis into a plurality of components, each of the components representing a contribution to lighting in the scene by a different type of light interaction, wherein the decomposing the color of the pixel comprises, for each type of light interaction:
            extracting a color component representing a contribution by the respective type of light interaction to color for the scene;
            extracting a reflectance component representing a contribution by the respective type of light interaction to texture for the scene;
            computing an irradiance component representing a contribution by the respective type of light interaction to lighting for the scene; and
            assessing a residual component representing a contribution by all unmatched paths to lighting for the scene;
        for each of the components, extracting one or more motion vectors for each of the components in order to capture motion in the scene; and
        computing, based on the motion vectors, a final contribution of each of the components to the color of the pixel.

2. The method of claim 1, wherein the type of light interaction comprises a diffuse scattering, a specular or glossy reflection, or a specular or glossy transmission.

3. The method of claim 2, wherein the type of light interaction comprises:
    a specular or glossy reflection followed by a diffuse scattering; or a series of two specular transmissions followed by a diffuse scattering.

4. The method of claim 1, wherein the extracting one or more motion vectors for a reflectance component comprises extracting primary motion vectors to estimate motion of shaded objects.

5. The method of claim 1, wherein the extracting one or more motion vectors for a reflectance component comprises extracting specular motion vectors to estimate apparent motion of objects in the scene observed through a sequence of specular reflections or refractions, wherein the extracting comprises performing temporal manifold exploration of light paths in a component, wherein the temporal manifold exploration is performed only up to a first non-specular interaction or light source, and wherein endpoints of the light paths remain attached to their underlying objects in the scene.

6. The method of claim 1, wherein the extracting one or more motion vectors for an irradiance component or for a residual component to estimate apparent motion of objects in the scene comprises generating an image-based optical flow.

7. The method of claim 1, further comprising, for each of the components:
extracting auxiliary features of the component.

8. The method of claim 7, further comprising:
generating an image-based optical flow, wherein the image-based optical flow leverages the auxiliary features.

9. The method of claim 1, further comprising:
performing denoising, spatial upsampling, or temporal interpolation of frames for each of the components separately, prior to the computing the final contribution of each of the components to the color of the pixel.

10. One or more computer-readable non-transitory storage media embodying software comprising instructions operable when executed to:
perform a light path analysis of an image comprising a scene, wherein the scene comprises at least one refractive or reflective object;
for each of a plurality of pixels in the image:
decompose a color of the pixel based on the light path analysis into a plurality of components, each of the components representing a contribution to lighting in the scene by a different type of light interaction, wherein the decomposing the color of the pixel comprises, for each type of light interaction:
extracting a color component representing a contribution by the respective type of light interaction to color for the scene;
extracting a reflectance component representing a contribution by the respective type of light interaction to texture for the scene;
computing an irradiance component representing a contribution by the respective type of light interaction to lighting for the scene; and
assessing a residual component representing a contribution by all unmatched paths to lighting for the scene;
for each of the components, extract one or more motion vectors for each of the components in order to capture motion in the scene; and
compute, based on the motion vectors, a final contribution of each of the components to the color of the pixel.

11. The media of claim 10, wherein the type of light interaction comprises a diffuse scattering, a specular or glossy reflection, or a specular or glossy transmission.

12. The media of claim 11, wherein the type of light interaction comprises:
a specular or glossy reflection followed by a diffuse scattering; or
a series of two specular transmissions followed by a diffuse scattering.

13. The media of claim 10, wherein the software comprising instructions operable when executed to decompose the color of the pixel comprises software comprising instructions operable when executed to, for each type of light interaction:
extract a color component representing a contribution by the respective type of light interaction to color for the scene;
extract a reflectance component representing a contribution by the respective type of light interaction to texture for the scene;
compute an irradiance component representing a contribution by the respective type of light interaction to lighting for the scene; and
assess a residual component representing a contribution by all unmatched paths to lighting for the scene.

14. The media of claim 13, wherein the software comprising instructions operable when executed to extract one or more motion vectors for a reflectance component comprises software comprising instructions operable when executed to extract primary motion vectors to estimate motion of shaded objects.

15. The media of claim 13, wherein the software comprising instructions operable when executed to extract one or more motion vectors for a reflectance component comprises software comprising instructions operable when executed to extract specular motion vectors to estimate apparent motion of objects in the scene observed through a sequence of specular reflections or refractions, wherein the extracting comprises performing temporal manifold exploration of light paths in a component, wherein the temporal manifold exploration is performed only up to a first non-specular interaction or light source, and wherein endpoints of the light paths remain attached to their underlying objects in the scene.

16. The media of claim 13, wherein the software comprising instructions operable when executed to extract one or more motion vectors for an irradiance component or for a residual component to estimate apparent motion of objects in the scene comprises software comprising instructions operable when executed to generate an image-based optical flow.

17. The media of claim 13, the software further comprising instructions operable when executed to, for each of the components:
extract auxiliary features of the component.

18. The media of claim 17, the software further comprising instructions operable when executed to:
generate an image-based optical flow, wherein the image-based optical flow leverages the auxiliary features.

19. A system comprising one or more processors and a memory coupled to the processors comprising instructions executable by the processors, the processors being operable when executing the instructions to:
perform a light path analysis of an image comprising a scene, wherein the scene comprises at least one refractive or reflective object;
for each of a plurality of pixels in the image:
decompose a color of the pixel based on the light path analysis into a plurality of components, each of the components representing a contribution to lighting in the scene by a different type of light interaction, wherein the decomposing the color of the pixel comprises, for each type of light interaction:

extracting a color component representing a contribution by the respective type of light interaction to color for the scene;

extracting a reflectance component representing a contribution by the respective type of light interaction to texture for the scene;

computing an irradiance component representing a contribution by the respective type of light interaction to lighting for the scene; and assessing a residual component representing a contribution by all unmatched paths to lighting for the scene;

for each of the components, extract one or more motion vectors for each of the components in order to capture motion in the scene; and compute, based on the motion vectors, a final contribution of each of the components to the color of the pixel.

\* \* \* \* \*

UNITED STATES PATENT AND TRADEMARK OFFICE
CERTIFICATE OF CORRECTION

PATENT NO. : 10,832,374 B2
APPLICATION NO. : 14/997448
DATED : November 10, 2020
INVENTOR(S) : Henning Zimmer et al.

It is certified that error appears in the above-identified patent and that said Letters Patent is hereby corrected as shown below:

On the Title Page

Item [73], after "(US)", insert --; ETH Zürich (Eidgenössische Technische Hochschule Zürich), Zürich (CH)--.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*